US012279677B2

(12) United States Patent
Todaka et al.

(10) Patent No.: US 12,279,677 B2
(45) **Date of Patent: *Apr. 22, 2025**

(54) TAPE, ZIPPER TAPE, AND CONTAINER WITH TAPE AND METHOD FOR MANUFACTURE THEREFOR

(71) Applicant: IDEMITSU UNITECH CO., LTD., Tokyo (JP)

(72) Inventors: Takumi Todaka, Tokyo (JP); Ryo Katada, Tokyo (JP); Takuto Ogawa, Tokyo (JP); Tomoyuki Kitajima, Tokyo (JP)

(73) Assignee: IDEMITSU UNITECH CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,773

(22) Filed: Dec. 15, 2023

(65) Prior Publication Data

US 2024/0115015 A1 Apr. 11, 2024

Related U.S. Application Data

(63) Continuation of application No. 17/764,246, filed as application No. PCT/JP2020/035678 on Sep. 23, 2020, now Pat. No. 11,882,908.

(30) Foreign Application Priority Data

Sep. 27, 2019 (JP) ................................ 2019-177128
Jan. 17, 2020 (JP) ................................ 2020-005889
Mar. 17, 2020 (JP) ................................ 2020-046759

(51) Int. Cl.
*A44B 19/34* (2006.01)
*B31B 70/81* (2017.01)
(Continued)

(52) U.S. Cl.
CPC .......... *A44B 19/34* (2013.01); *B31B 70/8131* (2017.08); *B65D 33/002* (2013.01);
(Continued)

(58) Field of Classification Search
CPC .. A44B 19/34; B65D 33/002; B65D 33/2541; B65D 75/5805; B31B 70/8131; B31B 2160/10
(Continued)

(56) References Cited

U.S. PATENT DOCUMENTS 5,664,303 A 9/1997 Johnson
9,085,393 B2 7/2015 Katada et al.
(Continued)

FOREIGN PATENT DOCUMENTS

CN 102596740 A 7/2012
CN 102652097 A 8/2012
(Continued)

OTHER PUBLICATIONS

Machine translation of JP 2009-23668 A. (Year: 2009).*
(Continued)

*Primary Examiner* — Jes F Pascua
(74) *Attorney, Agent, or Firm* — MILLEN, WHITE, ZELANO & BRANIGAN, P.C.; Ryan R. Pool

(57) ABSTRACT

A tape includes, in a cross-sectional shape: a first and a second portion which are configured to be at least partially in opposition. The first portion includes: thick portions provided in corresponding one of a first and a third region, out of the first, a second, and the third region in a width direction of the tape; a first and a second thin portion provided at respective both end portions, in the width direction, of the second region positioned between the first and the third region; and at least one intermediate portion provided between the first and the second thin portion. The
(Continued)

second portion includes: thick portions provided in corresponding one of the first and the third region and extending beyond end portions, in the width direction, of the second region; and at least one third thin portion provided in the second region and opposed to the intermediate portion.

23 Claims, 19 Drawing Sheets

(51) Int. Cl.
*B65D 33/00* (2006.01)
*B65D 33/25* (2006.01)
*B65D 75/58* (2006.01)
*B31B 160/10* (2017.01)

(52) U.S. Cl.
CPC ..... *B65D 33/2541* (2013.01); *B65D 75/5805* (2013.01); *B31B 2160/10* (2017.08)

(58) Field of Classification Search
USPC .................................. 383/63, 61.2, 203, 204
See application file for complete search history.

(56) References Cited

U.S. PATENT DOCUMENTS

| | | | | |
|---|---|---|---|---|
| 10,618,696 | B2 | 4/2020 | Ohyama et al. | |
| 11,882,908 | B2 * | 1/2024 | Todaka | B31B 70/645 |
| 2012/0207409 | A1 * | 8/2012 | Katada | B65D 33/2533 383/63 |
| 2012/0275730 | A1 | 11/2012 | Katada et al. | |
| 2014/0187402 | A1 * | 7/2014 | Goto | B31B 70/8133 493/213 |
| 2015/0055895 | A1 | 2/2015 | Kishi et al. | |
| 2018/0086508 | A1 | 3/2018 | Namba | |
| 2019/0016507 | A1 | 1/2019 | Todaka | |
| 2021/0107703 | A1 | 4/2021 | Todaka | |

FOREIGN PATENT DOCUMENTS

| | | | | | |
|---|---|---|---|---|---|
| CN | 105102339 | A | | 11/2015 | |
| CN | 108471847 | A | | 8/2018 | |
| CN | 114401901 | A | * | 4/2022 | A44B 19/16 |
| JP | S6396064 | A | | 4/1988 | |
| JP | 2007246137 | A | | 9/2007 | |
| JP | 2009023668 | A | * | 2/2009 | |
| JP | 2009214916 | A | | 9/2009 | |
| JP | 2011104334 | A | | 6/2011 | |
| JP | 2012056612 | A | | 3/2012 | |
| JP | 2012096839 | A | | 5/2012 | |
| JP | 2013112356 | A | | 6/2013 | |
| JP | 2013147288 | A | * | 8/2013 | |
| JP | 2014055016 | A | | 3/2014 | |
| JP | 2014069879 | A | | 4/2014 | |
| JP | 2014169097 | A | | 9/2014 | |
| JP | 2014218278 | A | | 11/2014 | |
| JP | 2015199534 | A | * | 11/2015 | |
| JP | 6087014 | B1 | | 3/2017 | |
| JP | 2017081574 | A | | 5/2017 | |
| JP | 2019137440 | A | * | 8/2019 | |
| JP | 2021080016 | A | * | 5/2021 | |
| KR | 20140138559 | A | | 12/2014 | |
| TW | 201641378 | A | | 12/2016 | |
| WO | 2011070996 | A1 | | 6/2011 | |
| WO | 2017051771 | A1 | | 3/2017 | |

OTHER PUBLICATIONS

Machine translation of JP 2013-147288 A. (Year: 2013).*
Office Action in corresponding TW application 109133306 dated Nov. 8, 2023 (pp. 1-12).
Machine translation of JP-2013147288-A.
International Search Report for PCT/JP2020/035678 dated Nov. 24, 2020.
English Abstract for JP2009214916, Publication Date: Sep. 24, 2009.
English Abstract for JP2014055016, Publication Date: Mar. 27, 2014.
English Abstract for JP2012056612, Publication Date: Mar. 22, 2012.
English Abstract for JP6087014, Publication Date: Mar. 1, 2017.
Office Action in corresponding CN appln No. 202080067351.8 dated Apr. 25, 2024 (pp. 1-22).
Office Action issued in the corresponding Chinese patent application No. 202080067351.8 on Apr. 15, 2023 (pp. 1-11).

* cited by examiner

TAPE, ZIPPER TAPE, AND CONTAINER WITH TAPE AND METHOD FOR MANUFACTURE THEREFOR

TECHNICAL FIELD

The invention relates to a tape, a zipper tape, a container equipped with a tape, and a method of manufacturing the container equipped with the tape.

BACKGROUND ART

As a packaging material for packaging various articles such as food, medicine, medical products, and miscellaneous goods, a packaging bag equipped with a zipper tape has been used, in which a pair of belt-shaped zipper tapes including a male member and a female member that engages with each other is disposed on an opening of the bag. The zipper tapes are engageable and disengageable with each other. Such a packaging bag equipped with a zipper tape is sealed by sealing an upper portion of the zipper tape. It is possible to unseal the packaging bag equipped with the zipper tape in such a manner as to tear a film of a bag body from, for example, a cutout, serving as a start position provided on each of both sides of the packaging bag.

As an example of such a technique, Patent Literature 1 (for example, FIG. 10, etc.) discloses a technique which stably guides tearing of a film of a bag body using thin portions and thick portions provided on bases of a zipper tape. The zipper tape is bonded to each of both surfaces of the bag body. A position of the thin portion on the zipper tape bonded to one surface is different from a position of the thin portion on the zipper tape bonded to the other surface. Providing the thin portions at different positions causes end portions of the zipper tape after tearing the film to be formed at different levels, and makes it easier to widen an opening by applying fingers, etc., to the end portion of the zipper tape when contents are taken out from the bag body.

CITATION LIST

Patent Literature(s)

Patent Literature 1: JP 2011-104334 A

SUMMARY OF THE INVENTION

Problems to be Solved by the Invention

However, in the technique described in Patent Literature 1, end portions of a zipper tape after unsealing may be formed at different levels or may not be formed at different levels depending on a direction in which a force for tearing a bag body acts.

Accordingly, an object of the invention is to provide a tape, a zipper tape, a container equipped with a tape, and a method of manufacturing the container equipped with the tape, which are able to more reliably cause shapes of end portions after unsealing to be formed at different levels regardless of the direction in which the tearing force acts.

Means for Solving the Problems

[1] A tape including, in a cross-sectional shape thereof: a first portion; and a second portion, the first portion and the second portion being configured to be at least partially opposed to each other, in which the first portion includes thick portions each provided in corresponding one of a first region and a third region, out of the first region, a second region, and the third region in a width direction of the tape, a first thin portion and a second thin portion provided at respective both end portions, in the width direction, of the second region, the second region being positioned between the first region and the third region, and at least one intermediate portion provided between the first thin portion and the second thin portion, and the second portion includes thick portions that are each provided in corresponding one of the first region and the third region and are extending beyond end portions, in the width direction, of the second region, and at least one third thin portion that is provided in the second region and is opposed to the intermediate portion.

[2] The tape according to [1], in which the intermediate portion has a thickness corresponding to thicknesses of the thick portions.

[3] The tape according to [1] or [2], in which the first thin portion, the second thin portion, and the third thin portion each have a thickness in a range from 10 μm to 200 μm, and the thick portions each provided in the corresponding one of the first region and the third region each have a thickness in a range from 200 μm to 700 μm.

[4] The tape according to any one of [1] to [3], in which the first region, the second region, and the third region cover the tape entirely.

[5] The tape according to any one of [1] to [4], in which the first portion and the second portion are coupled to each other at respective end portions, in the width direction, of the first portion and the second portion in the first region or the third region, the respective end portions being on a side opposite to the second region.

[6] A zipper tape including, in a cross-sectional shape thereof: a first portion; and a second portion, the first portion and the second portion being configured to be at least partially opposed to each other, in which the first portion and the second portion each include, in a cross-sectional shape thereof, a base strip and an engagement portion, the engagement portions projecting from the respective base strips and being engageable with each other, the first portion includes a thick portion provided in a first region, out of the first region, a second region, and a third region in a width direction of the zipper tape, a thick portion that is provided in the third region and is continuous with the base strip, a first thin portion and a second thin portion provided at respective both end portions, in the width direction, of the second region, the second region being positioned between the first region and the third region, and at least one intermediate portion provided between the first thin portion and the second thin portion, and the second portion includes thick portions that are each provided in corresponding one of the first region and the third region and are extending beyond end portions, in the width direction, of the second region, and at least one third thin portion that is provided in the second region and is opposed to the intermediate portion.

[7] The zipper tape according to [6], in which the intermediate portion has a thickness corresponding to thicknesses of the thick portions.

[8] The zipper tape according to [6] or [7], in which the first thin portion, the second thin portion, and the third thin portion each have a thickness in a range from 10 μm to 200 μm, and the thick portions each provided in the corresponding one of the first region and the third region each have a thickness in a range from 200 μm to 700 μm.

[9] The zipper tape according to any one of [6] to [8], in which the first region, the second region, and the third region cover an entire region excluding the base strips and the engagement portions of the zipper tape.

[10] The tape according to any one of [6] to [9], in which the first portion and the second portion are coupled to each other at respective end portions, in the width direction, of the first portion and the second portion in the first region, or at respective end portions, in the width direction, of the base strips, the respective end portions of the first portion and the second portion being on a side opposite to the second region, the respective end portions of the base strips being on a side opposite to the third region.

[11] A container equipped with a tape, the container including: a container body having a first surface and a second surface that are at least opposed to each other; and the tape according to any one of [1] to [5] or the zipper tape according to any one of [6] to [10] in which at least a portion of the first portion is bonded to the first surface and at least a portion of the second portion is bonded to the second surface.

[12] The container equipped with the tape according to [11], in which the thick portions and the intermediate portion of the first portion are bonded to the first surface, and the thick portions of the second portion are bonded to the second surface.

[13] The container equipped with the tape according to [11] or [12], in which the container body has a bag shape.

[14] The container equipped with the tape according to any one of [11] to [13], in which side seal portions where the first surface and the second surface are bonded to each other are provided at both ends of the container body, and a cutout is provided at an end portion in a longitudinal direction of the tape or the zipper tape in an overlapping manner on each of the side seal portions.

[15] The container equipped with the tape according to [14], in which the cutout is provided within the first portion including a taper portion or a bulging portion directed toward the first thin portion and the second thin portion, and the cutout is provided within the second portion including a taper portion or a bulging portion directed toward the third thin portion.

[16] The container equipped with the tape according to [15], in which the cutout is provided within the first portion including a first bulging portion and a second bulging portion respectively directed toward the first thin portion and the second thin portion, and the cutout is provided within the second portion including a taper portion directed toward the third thin portion.

[17] The container equipped with the tape according to [16], in which the first bulging portion projects toward a center in the longitudinal direction of the tape or the zipper tape at a great degree as compared with the second bulging portion.

[18] The container equipped with the tape according to [15], in which the cutout is provided within the first portion including a first taper portion and a second taper portion respectively directed toward the first thin portion and the second thin portion, and the cutout is provided within the second portion including a taper portion directed toward the third thin portion.

[19] The container equipped with the tape according to [14], in which the cutout is provided within the first portion including a first taper portion directed toward the first thin portion, and at least one inclined side or a curved part to be directed to the first taper portion, the cutout is provided within the second portion including a taper portion or a bulging portion directed toward the third thin portion, and, in a case where the first portion and the second portion are overlapped with each other, the at least one inclined side or the curved part traverses the third thin portion.

[20] The container equipped with the tape according to any one of [15] to [19], in which a first position where the taper portion or the bulging portion couples to the first thin portion in the first portion and a second position where the taper portion or the bulging portion couples to the third thin portion in the second portion are different from each other in the longitudinal direction of the zipper tape.

[21] The container equipped with the tape according to [20], in which the second position is close to the end portion in the longitudinal direction of the zipper tape as compared with the first position.

[22] The container equipped with the tape according to [21], in which a distance between the first position and the second position is in a range from 2 mm to 50 mm.

[23] A method of manufacturing the container equipped with the tape according to any one of [14] to [22], the method including: forming the cutouts in the tape or the zipper tape; bonding the tape or the zipper tape in which the cutouts are formed to the container body; and forming the side seal portions each traversing the cutouts on the container body to which the tape or the zipper tape is bonded.

According to the above-described configurations, in both a case where a force acts on the first surface side and a case where a force acts on the second surface side after attachment of the tape or the zipper tape to the bag body, a relationship is established that a thin portion which is provided on one of the sides opposite to a thin portion provided on the other side on which the force acts is positioned on a containing space. This makes it possible to more reliably cause shapes of the end portions after unsealing to be formed at different levels regardless of a direction in which a tearing force acts.

BRIEF DESCRIPTION OF DRAWING(S)

DESCRIPTION OF EMBODIMENT(S)

The following describes preferred exemplary embodiments of the invention in detail with reference to the accompanying drawings. It is to be noted that, in this description and the accompanying drawings, components that have substantially the same functional configuration are indicated by the same reference signs, and thus redundant description thereof is omitted.

First Exemplary Embodiment

Figure 1:
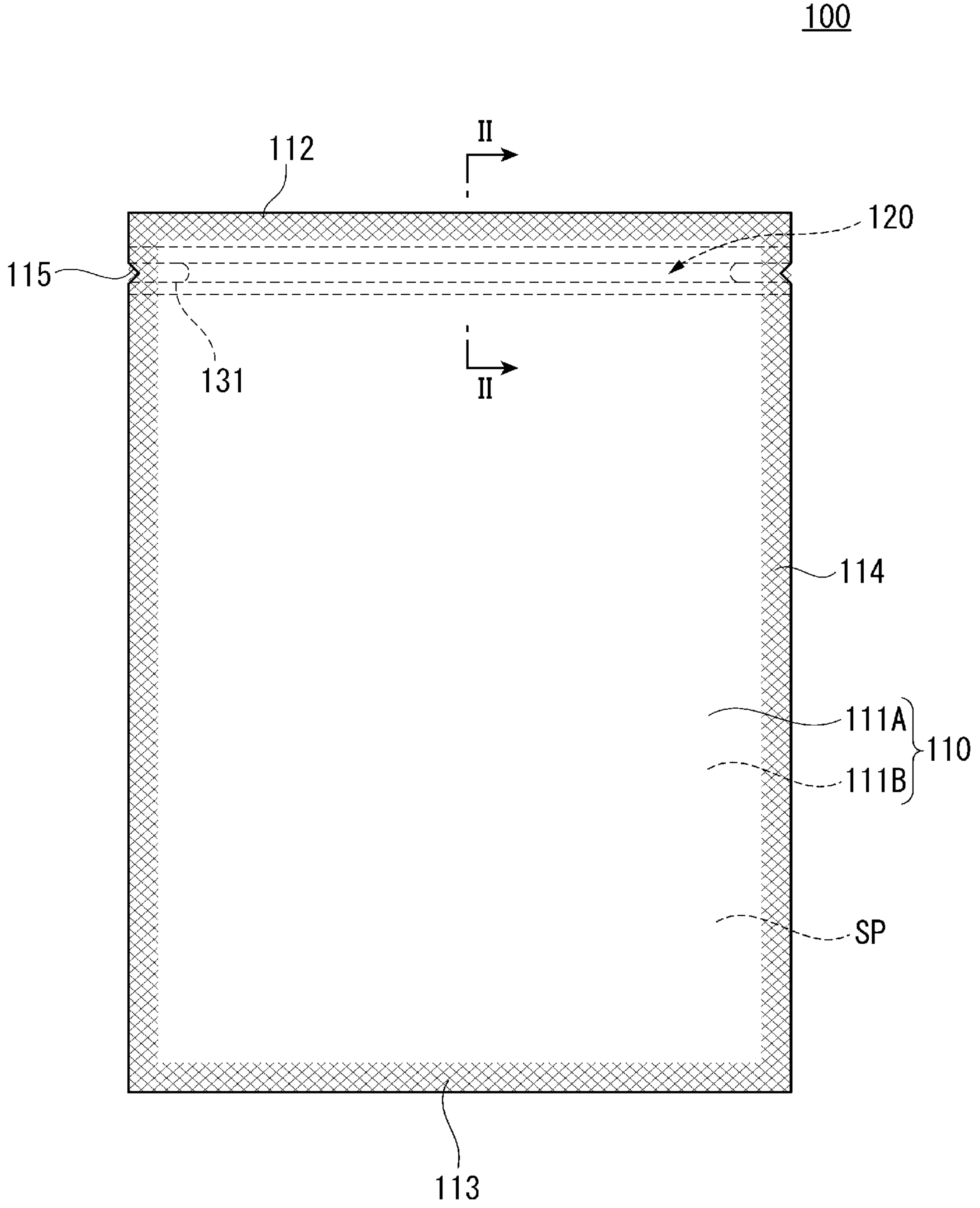
FIG. 1 is a plan view of a bag equipped with a tape according to a first exemplary embodiment of the invention.
Figure 2:
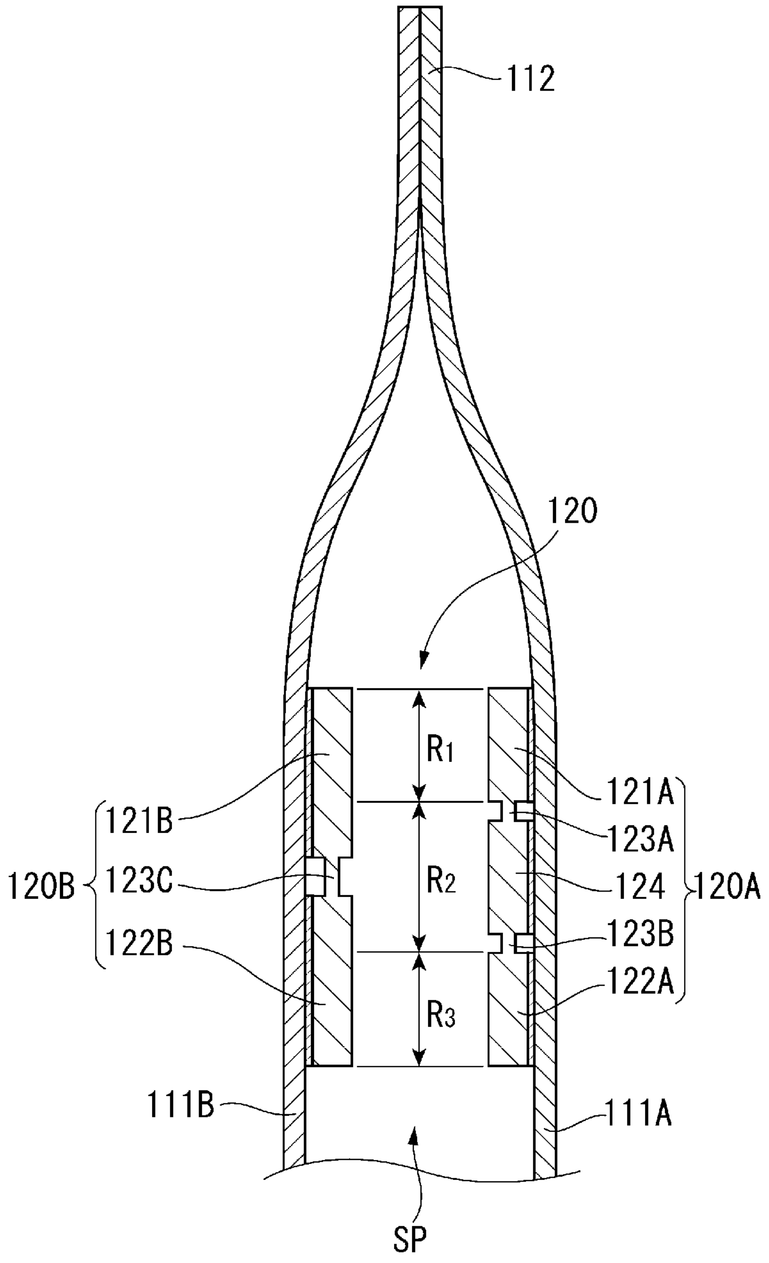
FIG. 2 is a cross-sectional view taken along a line II-II of FIG. 1.

FIG. 1 is a plan view of a bag equipped with a tape according to a first exemplary embodiment of the invention. FIG. 2 is a cross-sectional view taken along a line II-II of FIG. 1. As illustrated in the drawings, a bag 100 equipped with a tape includes: a bag body 110 including a film and having a first surface 111A and a second surface 111B that are opposed to each other; and a tape 120 bonded to each of the first surface 111A and the second surface 111B of the bag body 110, to define one side of a containing space SP provided between the first surface 111A and the second surface 111B.

The bag body 110 includes, for example, a single-layer or multi-layer thermoplastic resin film. Specifically, a thermoplastic resin may be low density polyethylene (LDPE), linear low density polyethylene (LLDPE), or polypropylene (PP). PP may be polypropylene homopolymer (HPP), polypropylene random copolymer (RPP), or polypropylene block copolymer (BPP). In a case where the bag body 110 includes a multi-layered film, biaxially oriented polypropylene (OPP), biaxially oriented polyethylene terephthalate (OPET), or biaxially oriented nylon (ONy) may be used for a surface base. These are each not limited to a resin derived from a fossil fuel, and may each be an environmentally friendly bioplastic or a mixture of a resin derived from a fossil fuel and a bioplastic. Examples of the bioplastic preferably include bio-polyethylene. Further, the film included in the bag body 110 may include a layer of a metallic material such as aluminum or a layer of an inorganic material. For example, the bag body 110 may include a monomaterial resin composition which includes polyethylene as a main component, as with the tape 120 or a zipper tape 220 to be described later. This enables achievement of an environmentally friendly configuration having excellent recyclability.

In the exemplary embodiment, the bag body 110 may be formed by overlapping two films with each other, and bonding the two films to each other at a top seal portion 112, a bottom seal portion 113, and a side seal portion 114. However, in another exemplary embodiment, the bag body 110 may be formed by folding a single film at a part corresponding to the side seal portion 114. Further, in the bag body 110, a part in which the film is folded inward, that is, a so-called gusset, may be formed in a part corresponding to the bottom seal portion 113 or the side seal portion 114. In this case, the gusset may be formed by the same film as that of the first surface 111A or the second surface 111B, or by another film that is different therefrom. The bag 100 equipped with the tape may also be a stand up pouch which is able to be placed upright by the gusset being formed at a bottom of the bag 100.

As illustrated in FIG. 2, the tape 120 is an elongated material that includes, in a cross-sectional shape thereof, a first portion 120A and a second portion 120B that are opposed to each other. The first portion 120A includes, in a cross-sectional shape thereof, a first thick portion 121A, a second thick portion 122A, thin portions 123A and 123B, and an intermediate portion 124. The second portion 120B includes, in a cross-sectional shape thereof, a first thick portion 121B, a second thick portion 122B, and a thin portion 123C. The first thick portions 121A and 121B and the second thick portions 122A and 122B may not necessarily have the same thickness, but the thin portions 123A, 123B, and 123C (hereinafter, sometimes collectively referred to as thin portions 123) are each a portion that is thinner than both the first thick portions 121A and 121B and the second thick portions 122A and 122B (hereinafter, sometimes collectively referred to as thick portions 121 and 122). The intermediate portion 124 is thicker than the thin portions 123A and 123B. A magnitude relation in thickness of the intermediate portion 124 versus the thick portions 121A and 122A is not necessarily limited. However, in a case where the intermediate portion 124 is bonded to the first surface 111A together with the thick portions 121A and 122A as in the illustrated example, for example, it is preferable that the intermediate portion 124 has a thickness corresponding to thicknesses of the thick portions 121A and 122A. Here, the corresponding thickness does not necessarily have to be exactly the same thickness as the thicknesses of the thick portions 121A and 122A, but means a thickness that is close to an extent that is easy enough to bond the thick portions 121A and 122A and the intermediate portion 124 to the same surface, i.e., the first surface 111A, as in the illustrated example, for example. Specifically, the thickness of the intermediate portion 124 is preferably within a range of ±20% of the thicknesses of the thick portions 121A and 122A, more preferably within a range of ±10% of the thicknesses of the thick portions 121A and 122A, and still more preferably the same thickness as the thicknesses of the thick portions 121A and 122A. In a case where the thicknesses of the thick portions 121A and 122A are different from each other, it is preferable that the thickness of the intermediate portion 124 is within the ranges described above with respect to an average value of the thicknesses of the thick portions 121A and 122A. Setting the thickness of the intermediate portion 124 within the above ranges allows the intermediate portion 124 to be more reliably bonded to the first surface 111A. The same applies to the intermediate portion provided on the second portion 120B in an example to be described later.

The first portion 120A is bonded to the first surface 111A of the bag body 110 at the first thick portion 121A and the second thick portion 122A. Also, the second portion 120B is bonded to the second surface 111B of the bag body 110 at the first thick portion 121B and the second thick portion 122B.

In the illustrated example, the first portion 120A is bonded to the first surface 111A also at the intermediate portion 124; however, the intermediate portion 124 may not be bonded to the first surface 111A. From a viewpoint of facilitating alignment during manufacturing, it is advantageous to bond the intermediate portion 124 to the first surface 111A. Further, respective entire surfaces of the first thick portions 121A and 121B and the second thick portions 122A and 122B may not be bonded to the first surface 111A or the second surface 111B. For example, parts adjacent to the thin portions 123A, 123B, and 123C, of the first thick portions 121A and 121B and the second thick portions 122A and 122B may not be bonded to the first surface 111A or the second surface 111B. In this case, a part having a thickness midway between the thickness of the thick portion 121 or 122 and the thickness of the thin portion 123 may be provided between the thick portion 121 or 122 and the thin portion 123.

The tape 120 described above is formed, for example, by extrusion molding of a polyolefin-based resin. More specifically, the tape 120 may include low density polyethylene (LDPE), linear low density polyethylene (LLDPE), or polypropylene (PP). PP may be polypropylene homopolymer (HPP), polypropylene random copolymer (RPP), or polypropylene block copolymer (BPP). These are each not limited to a resin derived from a fossil fuel, and may each be an environmentally friendly bioplastic or a mixture of a resin derived from a fossil fuel and a bioplastic. Examples of the bioplastic preferably include bio-polyethylene. To the material of the tape 120, a known additive such as a stabilizer, an antioxidant, a lubricant, an antistatic agent, or a colorant may be added as necessary.

The tape 120 may include a monomaterial resin composition which includes polyethylene as a main component. In this case, the tape 120 as a whole, that is, the first thick portions 121A and 121B, the second thick portions 122A and 122B, the thin portions 123A, 123B, and 123C, and the intermediate portion 124, each include the resin composition which includes polyethylene as the main component. Here, the main component is a component that occupies a predetermined percentage or more of the resin composition, and a content of the component is usually more than or equal to 50 mass %, preferably more than or equal to 70 mass %, more preferably more than or equal to 90 mass %, still more preferably more than or equal to 95 mass %, particularly preferably more than or equal to 98 mass %, and most preferably 100%. However, even in the case where the content of the main component is 100%, mixing of an additive and impurities is acceptable. The main component is confirmable by, for example, an IR method. The tape 120 including the monomaterial resin composition which includes polyethylene as the main component enables an environmentally friendly configuration having excellent recyclability. Further, using bio-polyethylene as polyethylene makes it possible to achieve an environmentally friendly configuration which is further excellent in recyclability.

Here, as illustrated in FIG. 2, a first region $R_1$, a second region $R_2$, and a third region $R_3$ are defined in a width direction of the tape 120. Those regions are each common to the first portion 120A and the second portion 120B of the tape 120, in a state in which the first portion 120A and the second portion 120B are opposed to each other. The second region $R_2$ is positioned between the first region $R_1$ and the third region $R_3$. The first region $R_1$, the second region $R_2$, and the third region $R_3$ may cover the tape 120 entirely in the width direction as in the example illustrated in FIG. 2, or may not cover the tape 120 entirely as in another example to be described later. The first portion 120A includes: the first thick portion 121A and the second thick portion 122A respectively provided in the first region $R_1$ and the third region $R_3$; the thin portion 123A and the thin portion 123B provided at respective both end portions, in the width direction, of the second region $R_2$; and the intermediate portion 124 provided between the thin portion 123A and the thin portion 123B. In contrast, the second portion 120B includes the first thick portion 121B and the second thick portion 122B that are respectively provided in the first region $R_1$ and the third region $R_3$ and are extending beyond the end portions, in the width direction, of the second region $R_2$. In other words, the second portion 120B includes the first thick portion 121B and the second thick portion 122B respectively provided from the first region $R_1$ or the third region $R_3$, over a portion of the second region $R_2$. The thin portion 123C provided in the second region $R_2$ of the second portion 120B is opposed to the intermediate portion 124 of the first portion 120A.

As described above, in the exemplary embodiment, the thin portion 123A and the thin portion 123B are provided at the both end portions, in the width direction, of the second region $R_2$ in the first portion 120A, whereas the first thick portion 121B and the second thick portion 122B extend beyond the respective end portions, in the width direction, of the second region $R_2$ in the second portion 120B. Thus, the thin portions 123A and 123B are each not opposed to the thin portion of the second portion 120B. The thin portion 123C provided in the second portion 120B is not opposed to a region of the thin portions 123A and 123B of the first portion 120A, but is opposed to the intermediate portion 124 provided between the thin portions. As a result, in a case where the first portion 120A and the second portion 120B are opposed to each other, the thin portions 123A to 123C are disposed alternately in the width direction of the tape 120. Specifically, the thin portion 123A, the thin portion 123C, and the thin portion 123B are disposed in this order from a top seal portion 112 side without being overlapped with each other.

Figure 3A:
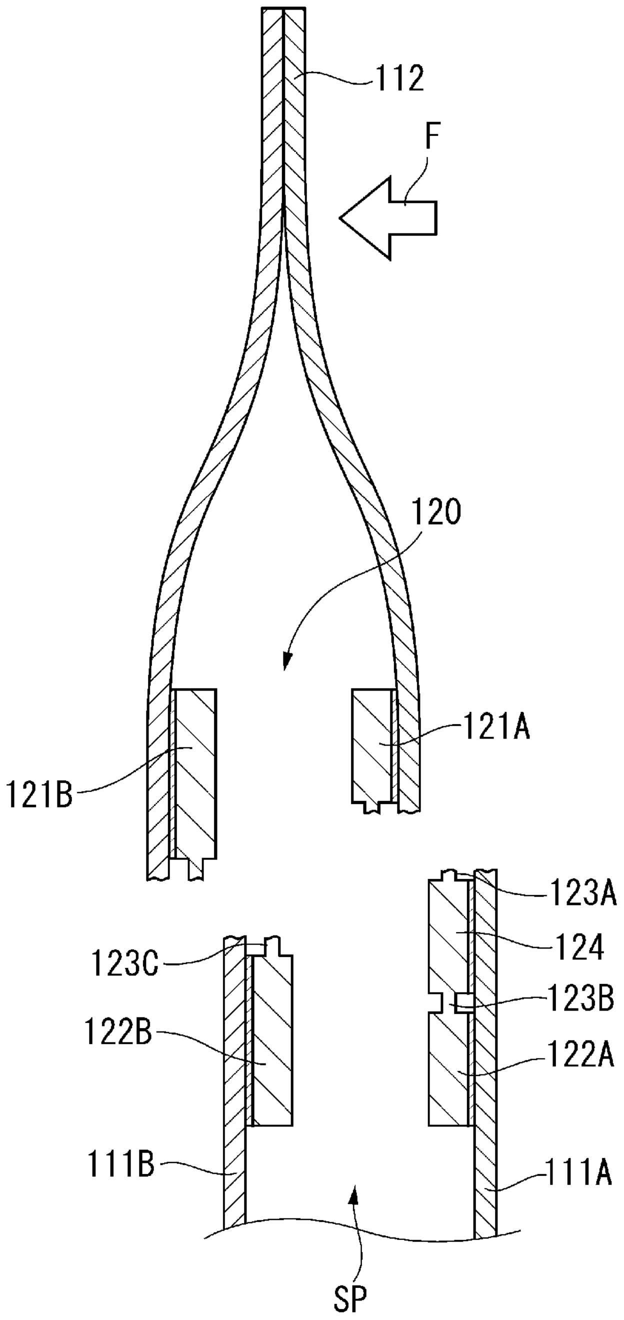
FIG. 3A is a diagram illustrating a case where a force acts on a first surface side in an example illustrated in FIG. 1.
Figure 3B:
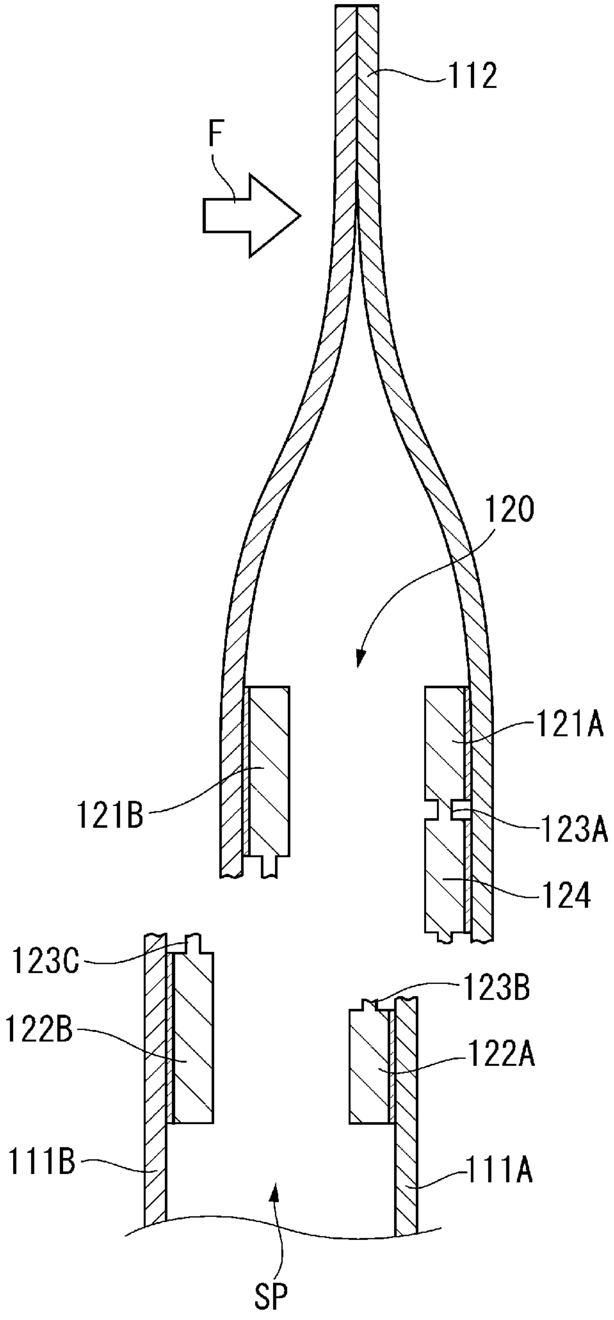
FIG. 3B is a diagram illustrating a case where a force acts on a second surface side in the example illustrated in FIG. 1.

With such a configuration, the bag 100 equipped with the tape according to the exemplary embodiment makes it possible, in a case where, for example, a user tears and unseals the bag body 110 from a notch 115 as a starting point, to cause end portions of the tape 120 and the bag body 110 after the unsealing to be formed at different levels. The notch 115 is provided in the side seal portion 114 at an end portion in a longitudinal direction of the tape 120. Specifically, for example, in a case where a force F for tearing the bag body 110 acts on a first surface 111A side as illustrated in FIG. 3A, the thin portion 123A breaks at the first portion 120A of the tape 120, the thin portion 123C breaks at the second portion 120B of the tape 120, and the tearing of the bag body 110 is guided along the thin portions 123A and 123C. This causes the end portions of the tape 120 and the bag body 110 after the unsealing to be formed at different levels. In a case where the force F for tearing the bag body 110 acts on a second surface 111B side as illustrated in FIG. 3B, the thin portion 123C breaks at the second portion 120B of the tape 120, the thin portion 123B breaks at the first portion 120A of the tape 120, and the tearing of the bag body 110 is guided along the thin portions 123B and 123C. This also causes the end portions of the tape 120 and the bag body 110 after the unsealing to be formed at different levels.

According to the findings of the inventors of the invention, the end portions of the tape 120 after the breakage tends to be formed at different levels in a case where, with respect to a thin portion provided on a side (i.e., the first surface 111A side in the example of FIG. 3A or the second surface 111B side in the example of FIG. 3B) on which the force F for tearing the bag body 110 acts, a thin portion provided on the opposite side is positioned on a containing space SP side. Accordingly, in a case where, for example, the thin portion 123B is not provided in the first portion 120A of the tape 120 in the above-described example, the end portions of the tape 120 after the unsealing are formed at different levels by breaking the thin portion 123A and the thin portion 123C if the force F acts on the first surface 111A side as in the example illustrated in FIG. 3A. However, if the force F acts on the second surface 111B side as in the example illustrated in FIG. 3B, there is a possibility that the end portions of the tape 120 and the bag body 110 after the unsealing may not be formed at different levels. A reason for this is that the thin portion 123A is positioned close to the top seal portion 112 side as compared with the thin portion 123C, thus, the first portion 120A breaks not at the thin portion 123A but near the intermediate portion 124 (this portion is not called "intermediate portion" in the case where the thin portion 123B is not provided).

In contrast, the exemplary embodiment satisfies a relationship that a thin portion which is provided on a side opposite to a thin portion provided on the other side on which the force acts is positioned on the containing space SP side, in both the case where the force acts on the first surface 111A side and the case where the force acts on the second surface 111B side as described above. Therefore, it is possible to cause the end portions of the tape 120 and the bag body 110 after the unsealing to be formed at different levels more reliably regardless of the direction in which the force acts. This makes it easier to, as described above, widen the opening by applying fingers, etc., to the end portion of the tape when contents are taken out of the bag body. In order to make it further easier to widen the opening, a rib directed to an inside of the bag body may be provided on an end portion of each portion (the thick portion or the intermediate portion) other than the thin portion.

In the exemplary embodiment, the thin portions 123A, 123B, and 123C may be thinner than adjacent portions, i.e., the thick portions 121 and 122 and the intermediate portion 124, and may each have a thickness of, for example, less than or equal to 200 μm in such a manner as to break easily by the force described above. The thin portions 123A, 123B, and 123C each have a thickness of preferably less than or equal to 150 μm, more preferably less than or equal to 120 μm, still more preferably less than or equal to 100 μm, and particularly preferably less than or equal to 80 μm. Setting the thickness within such a range makes it possible to lower a tensile strength, and to break the thin portion more easily. A lower limit of the thickness of each of the thin portions 123A, 123B, and 123C is not particularly limited, but is usually 10 μm.

In contrast, the thin portions 123A, 123B, and 123C each have a size in the width direction of the tape 120 of usually more than or equal to 10 μm, and preferably more than or equal to 30 μm. An upper limit thereof is usually 3 mm, and preferably less than or equal to 1 mm. Setting the size within this range improves an unsealing property owing to interaction with R (a curvature radius) of a cutout 131 to be described in an example below, for example.

In a case where the tape 120 is formed by, for example, extrusion-molding, thickness transition portions are formed between: the thick portions 121 and 122 or the intermediate portion 124; and the thin portions 123A, 123B, and 123C. In this case, the thin portions 123A, 1238, and 123C are each specified as a portion which is thinner than the thinner one of the thick portions 121 and 122 or the intermediate portion 124 on both sides. Thus, if the respective thicknesses of the thick portions 121 and 122 or the intermediate portion 124 on the both sides are different from each other, portions (the thickness transition portions) that are each neither the thick portion, nor the intermediate portion, nor the thin portion may be present between the thicker ones and the thin portions 123A, 1238, and 123C. Further, in the case where the thicknesses of the thin portions 123A, 1238, and 123C are specifically defined as described above, the thin portions 123A, 123B, and 123C are each specified as a portion satisfying the definition of the thickness. In this case, the portions (the thickness transition portions) that are each neither the thick portion, nor the intermediate portion, nor the thin portion may be present between: the thick portions 121 and 122 or the intermediate portion 124; and the thin portions 123A, 1238, and 123C.

In contrast, the thick portions 121 and 122 may be thicker than the adjacent thin portions 123A, 1238, and 123C, and may each have a thickness of, for example, preferably more than or equal to 200 μm, more preferably more than or equal to 250 μm, and still more preferably more than or equal to 300 μm. Setting the thickness of each of the thick portions 121 and 122 to more than or equal to 200 μm makes it possible to increase a tensile strength, and to prevent the thick portions 121 and 122 from being broken by the force at the time of unsealing. An upper limit of the thickness of each of the thick portions 121 and 122 is not particularly limited, but is usually 700 μm. Setting the thickness of each of the thick portions 121 and 122 to less than or equal to 700 μm makes it possible to prevent generation of a pinhole due to melting and flattening.

In addition, as described above, the bag body 110 is formed by overlapping two films with each other, or by folding a single film. In the case where the two films are overlapped with each other, directions in which crystals are oriented are adjusted between the film of the first surface 111A and the film of the second surface 111B, thereby guiding the tearing of the bag body 110 from the notch 115 as the starting point to be directed in different directions between the first surface 111A side and the second surface 111B side. This makes it possible to easily cause the end portions of the bag body 110 after the unsealing to be formed at different levels. Similarly, in the case where the single film is folded, a fold between the first surface 111A and the second surface 111B is adjusted in such a manner as to be non-parallel and non-perpendicular with respect to a direction in which crystals are oriented. This also makes it possible to easily cause the end portions of the bag body 110 after the unsealing to be formed at different levels.

Figure 4:
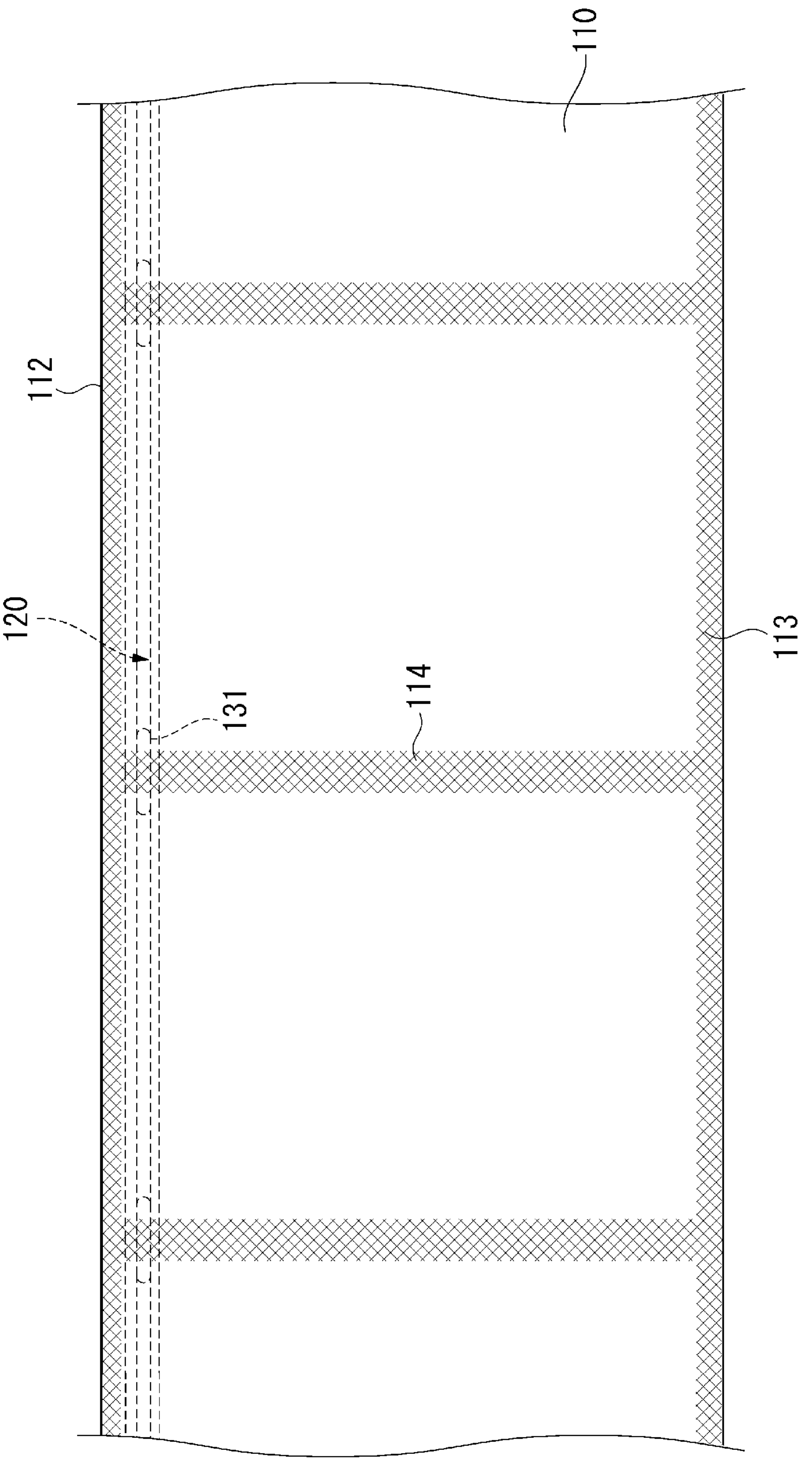
FIG. 4 is a diagram for describing an example of a method of manufacturing a tape according to the first exemplary embodiment of the invention.

FIG. 4 is a diagram for describing an example of a method of manufacturing a tape according to the first exemplary embodiment of the invention. As also illustrated in FIG. 1, the bag 100 equipped with the tape according to the exemplary embodiment has the cutout 131 that is provided in an overlapping manner on the side seal portion 114 at an end portion in the longitudinal direction of the tape 120. The cutout 131 is formed, for example, when the bag 100 equipped with the tape is continuously manufactured by a bag making machine, as illustrated in FIG. 4. Specifically, the cutouts 131 (openings at this point) are formed on the elongated tape 120 at an interval that is equal to a width of the bag body 110 that has been manufactured, that is, an interval of the side seal portions 114. Thereafter, the tape 120 is bonded to the bag body 110, and the side seal portion 114 that traverses the cutout 131, the top seal portion 112, and the bottom seal portion 113 are formed. The bag body 110 to which the tape 120 is bonded is cut along the center of the side seal portion 114, thereby obtaining the bag 100 equipped with the tape as illustrated in FIG. 1.

Figure 5A:
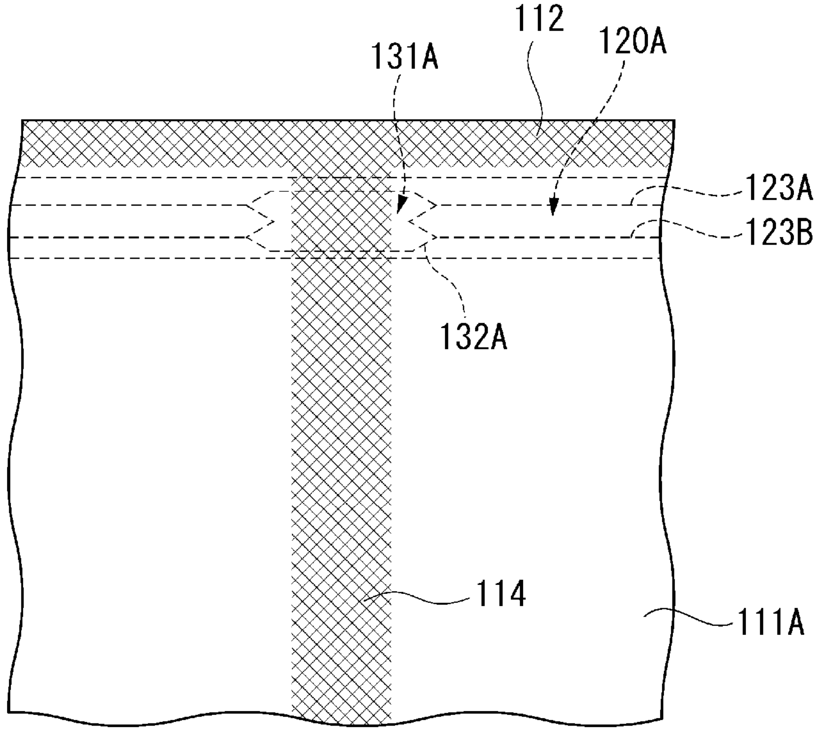
FIG. 5A is a diagram illustrating an example of a shape of a cutout in an example illustrated in FIG. 4.
Figure 5B:
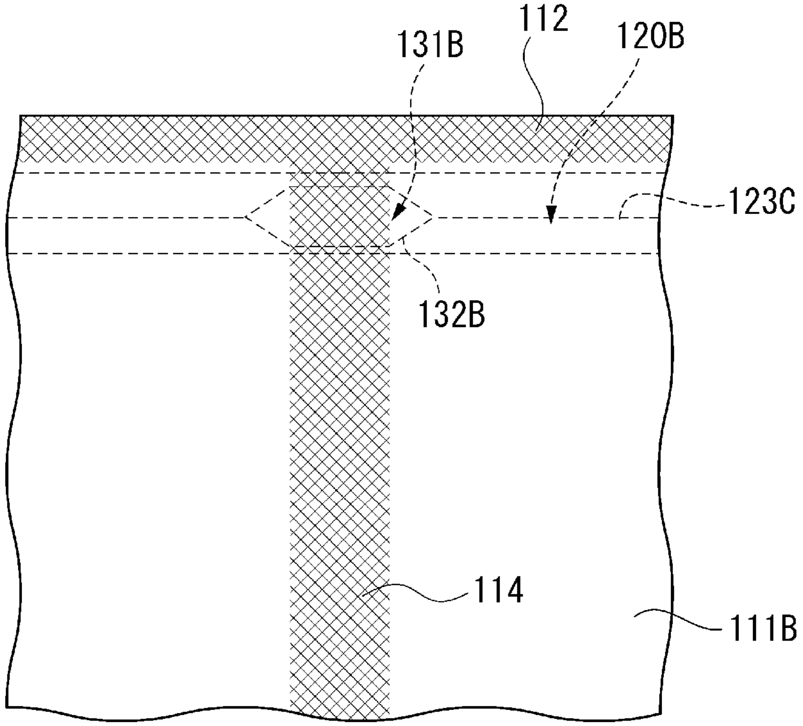
FIG. 5B is a diagram illustrating an example of a shape of a cutout in the example illustrated in FIG. 4.

In a case where the user attempts to tear the bag body 110 from, as the starting point, the notch 115 formed in the side seal portion 114 on the end portion in the longitudinal direction of the tape 120, for example, the cutout 131 thus formed guides the tearing of the bag body 110 from the notch 115 as the starting point to proceed along the thin portion formed in the tape 120. Specifically, for example, as illustrated in FIG. 5A, the first portion 120A side of the tape 120 may have a cutout 131A having a shape including a taper portion 132A that is bifurcated toward the thin portions 123A and 123B. Further, as illustrated in FIG. 5B, the second portion 120B side of the tape 120 may have a cutout 131B having a shape including a single taper portion 132B directed toward the thin portion 123C. As described above, the cutouts 131 are formed in the respective shapes adapted to the positions of the thin portions provided in the first portion 120A of the tape 120 and the position of the thin portion provided in the second portion 120B of the tape 120. This makes it possible to more easily and reliably obtain effects of causing the end portions of the tape 120 and the bag body 110 after the unsealing to be formed at different levels as described above. Further, it is preferable that an end of the taper portion has R (the curvature radius). Having R makes it possible to guide the tearing to the thin portion even if slight deviation occurs in a position of an end of a sharp angle during processing, and thus makes it possible to reduce the number of rejected products. R is, for example, in a range from 0.1 mm to 1.0 mm, and preferably from 0.2 mm to 0.7 mm.

Figure 6:
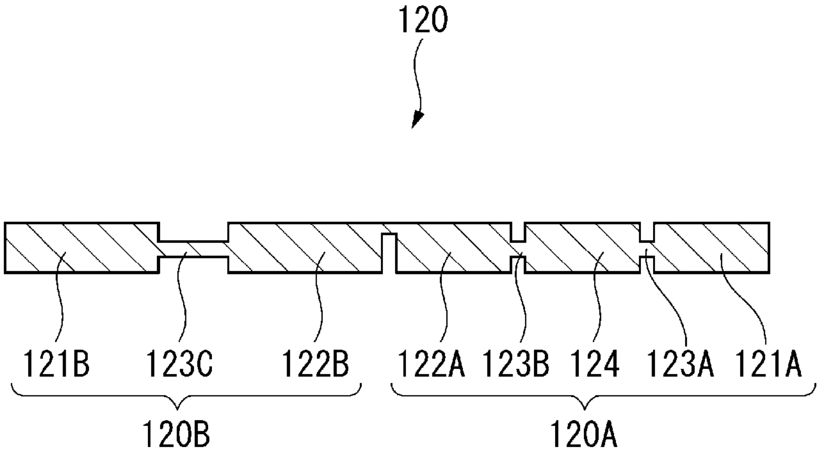
FIG. 6 is a cross-sectional view of an example of a tape according to the first exemplary embodiment of the invention.

FIG. 6 is a cross-sectional view of an example of a tape according to the first exemplary embodiment of the invention. The tape 120 attached to the bag body 110 in the example described above with reference to FIGS. 1 and 2 is supplied independently prior to the attachment to the bag body 110. In this case, the first portion 120A and the second portion 120B may be coupled to each other at any position and supplied. For example, as illustrated in the drawings, the first portion 120A and the second portion 120B may be supplied in a state in which the respective end portions, in the width direction, of the first portion 120A and the second portion 120B in the third region $R_3$ are coupled to each other. The respective end portions are on a side opposite to the second region $R_2$ illustrated in FIG. 2, i.e., between the second thick portions 122A and 122B. Alternatively, the first portion 120A and the second portion 120B may be supplied in a state in which the respective end portions, in the width direction, of the first portion 120A and the second portion 120B in the first region $R_1$ are coupled to each other. The respective end portions are on a side opposite to the second region $R_2$ illustrated in FIG. 2, i.e., between the first thick portions 121A and 121B. In this case, it is also possible to cause the first portion 120A and the second portion 120B of the tape 120 to be opposed to each other by decoupling or folding a coupled portion. In other words, the tape 120 according to the exemplary embodiment does not necessarily have to have the first portion 120A and the second portion 120B that are opposed to each other at the time of supplying, and may be configured in such a manner that it is possible to cause the first portion 120A and the second portion 120B to be opposed to each other.

In the example described above, the coupled portion between the first portion 120A and the second portion 120B of the tape 120 is finally decoupled. However, a process of decoupling the coupled portion may be performed prior to attaching the tape 120 to the bag body 110, or may be performed after attaching the tape 120 to the bag body 110. In the latter case, at a point of time when the tape 120 is attached to the bag body 110, the first portion 120A and the second portion 120B are opposed to each other by the tape 120 being folded at the coupled portion. In this case, it is possible to cause the first portion 120A and the second portion 120B to be opposed to each other in a fixed positional relation. For example, maintaining a state in which the first portion 120A and the second portion 120B are coupled to each other until the above-described cutouts 131 are formed makes it possible to reduce positional deviation of the cutouts 131 between the first portion 120A and the second portion 120B.

Figure 7:
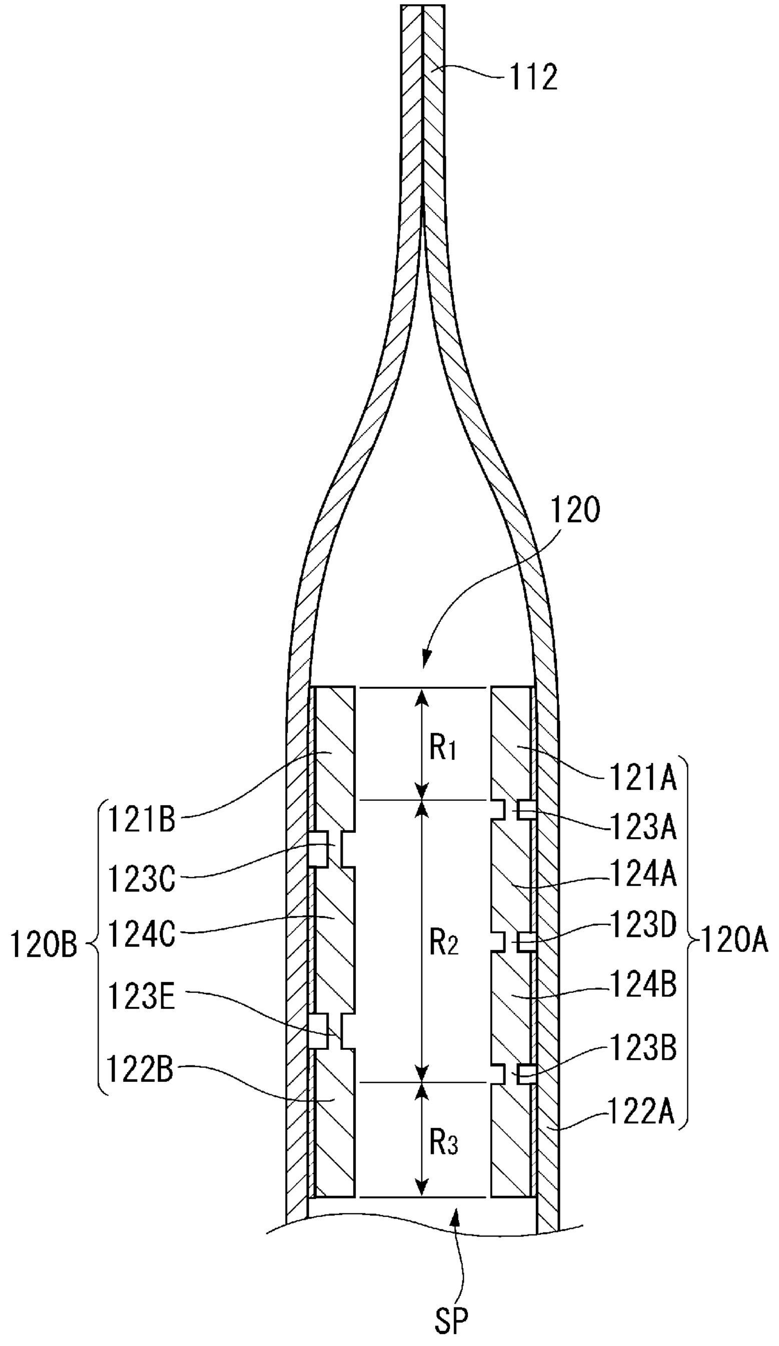
FIG. 7 is a cross-sectional view of a modification of the first exemplary embodiment.
Figure 8:
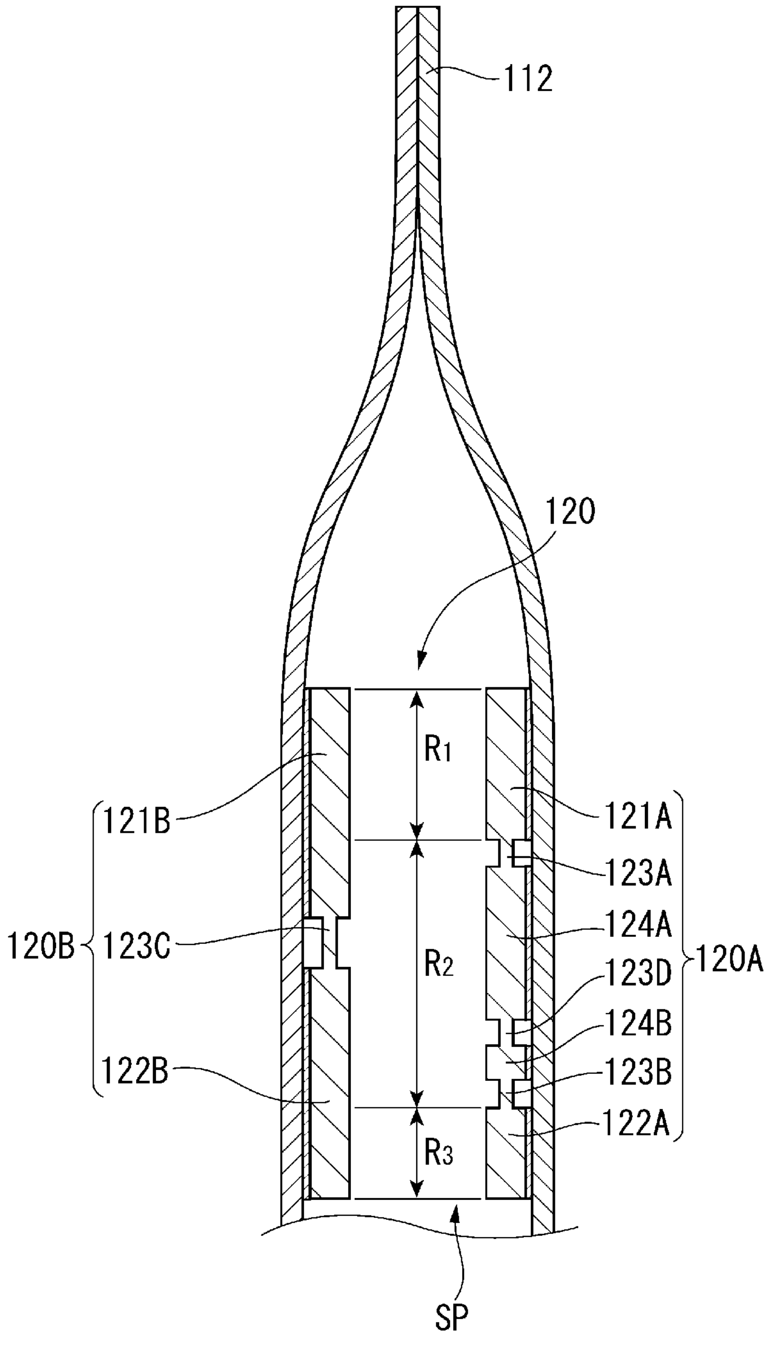
FIG. 8 is a cross-sectional view of a modification of the first exemplary embodiment.

FIGS. 7 and 8 are each a cross-sectional view of a modification of the first exemplary embodiment. In the examples described above referring to FIG. 2, etc., in the tape 120, the first portion 120A includes: the first thick portion 121A and the second thick portion 122A respectively provided in the first region $R_1$ and the third region $R_3$; the thin portions 123A and 123B provided at respective both end portions of the second region $R_2$; and the intermediate portion 124 provided between the thin portions 123A and 123B. The second portion 120B includes: the first thick portion 121B and the second thick portion 122B that are respectively provided in the first region $R_1$ and the third region $R_3$ and are extending beyond the end portions of the second region $R_2$; and the thin portion 123C opposed to the intermediate portion 124 of the first portion 120A.

In the example of FIG. 7, the first portion 120A also includes: the first thick portion 121A and the second thick portion 122A respectively provided in the first region $R_1$ and the third region $R_3$; and the thin portions 123A and 123B provided at respective both end portions of the second region $R_2$. However, in the example of FIG. 7, two intermediate portions 124A and 124B are provided between the thin portions 123A and 123B, and another thin portion 123D is provided between the intermediate portions 124A and 124B. In contrast, in the example of FIG. 7, the second portion 120B also includes the first thick portion 121B and the second thick portion 122B that are respectively provided in the first region $R_1$ and the third region $R_3$, and are extending beyond the end portions of the second region $R_2$. However, in the example of FIG. 7, two thin portions 123C and 123E are provided at parts other than the both ends of the second region $R_2$. The thin portions 123C and 123E are respectively opposed to the intermediate portions 124A and 124B of the first portion 120A. In other words, in the exemplary embodiment, the number of thin portions of the second portion 120B that are opposed to the intermediate portions of the first portion 120A is not limited to one, and may be two or more. Also in this case, the thin portion provided in the first portion 120A and the thin portion provided in second portion 120B are not opposed to each other. This makes it possible to cause the end portions of the tape 120 after the unsealing to be formed at different levels regardless of the direction in which the force acts as with the example of FIG. 2.

In the example of FIG. 8, the first portion 120A also includes: the first thick portion 121A and the second thick portion 122A respectively provided in the first region $R_1$ and the third region $R_3$; and the thin portions 123A and 123B provided at respective both end portions of the second region $R_2$. However, in the example of FIG. 8, two intermediate portions 124A and 124B are provided between the thin portions 123A and 123B, and another thin portion 123D is provided between the intermediate portions 124A and 124B. The example of FIG. 8 is different from the example of FIG. 7 in that the thin portion 123D is not provided midway between the thin portions 123A and 123B, but is formed at a position nearer to the thin portion 123B. The intermediate portion 124A is therefore wider than the intermediate portion 125B. In contrast, in the example of FIG. 8, the second portion 120B is formed similarly to the example of FIG. 2, and includes the first thick portion 121B, the second thick portion 122B, and the thin portion 123C. The thin portion 123C is opposed to the intermediate portion 124A of the first portion 120A. Also in this case, the thin portion provided in the first portion 120A and the thin portion provided in second portion 120B are not opposed to each other. This makes it possible to cause the end portions of the tape 120 after the unsealing to be formed at different levels regardless of the direction in which the force acts as with the example of FIG. 2.

Figure 9:
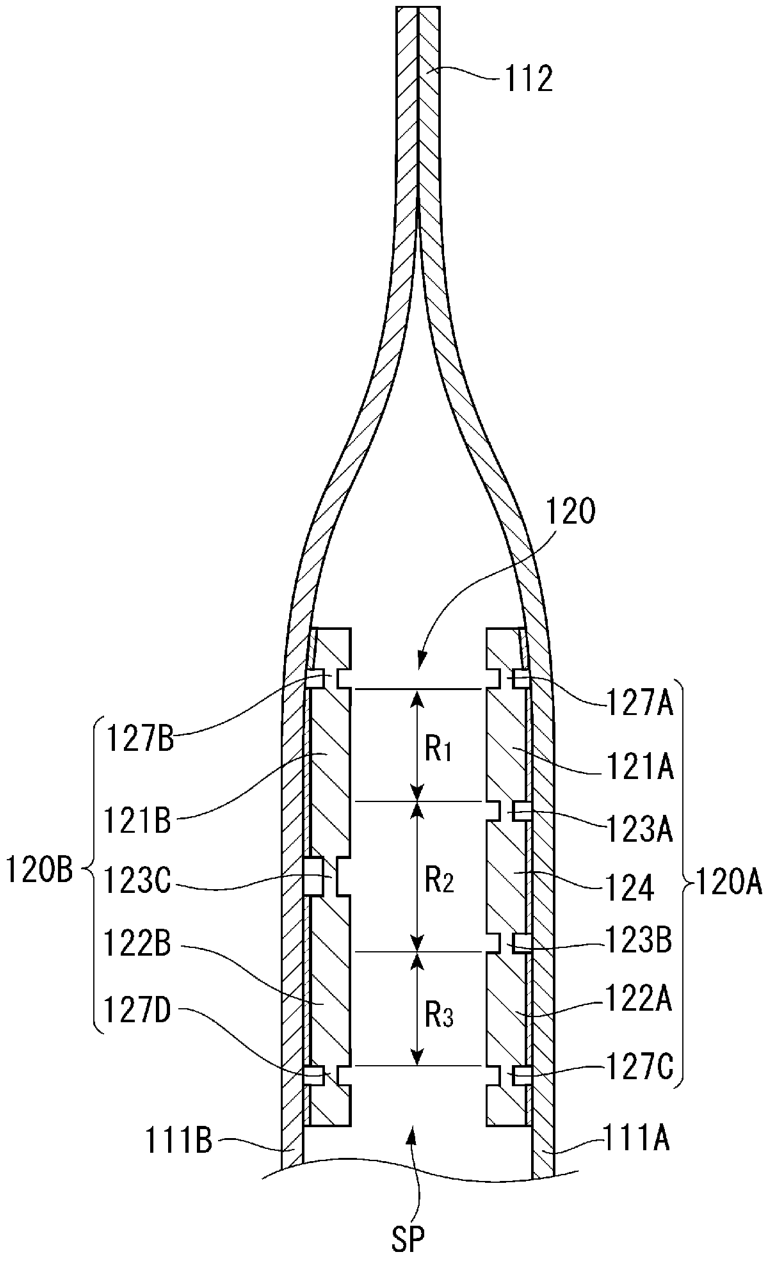
FIG. 9 is a cross-sectional view of another modification of the first exemplary embodiment.

FIG. 9 is a cross-sectional view of another modification of the first exemplary embodiment. In the example illustrated in FIG. 9, the first region $R_1$, the second region $R_2$, and the third region $R_3$ defined in the width direction of the tape 120 do not cover the tape 120 entirely. In the illustrated example, thin portions 127A and 127B are respectively provided at end portions of the tape 120 on sides of the thick portions 121A and 121B, and thin portions 127C and 127D are respectively provided at end portions of the tape 120 on sides of the thick portions 122A and 122B. These thin portions 127, unlike the thin portions 123 described above, are not intended to be broken when unsealing the bag 100 equipped with the tape. Specifically, for example, the thin portions 127 may be thicker than the thin portions 123. Alternatively, even if the thin portions 127 are as thin as the thin portions 123, the thin portions 127 do not break when unsealing the bag 100 equipped with the tape if the taper portion of the cutout 131 as described above with reference to FIGS. 5A and 5B is directed toward the thin portion 123 and is not directed toward the thin portion 127. In such cases, the first region $R_1$ is defined as a region in which the thick portion 121A and the thick portion 121B are provided (not including the thin portions 127A and 127B). In a similar manner, the third region $R_3$ is defined as a region in which the thick portion 122A and the thick portion 122B are provided (not including the thin portions 127C and 127D). In the illustrated examples, regions of the thin portions 127A to 127D and on sides of the end portions of the thin portions 127A to 127D in the width direction of the tape 120 are excluded from the first region $R_1$, the second region $R_2$, and the third region $R_3$.

Second Exemplary Embodiment

Figure 10:
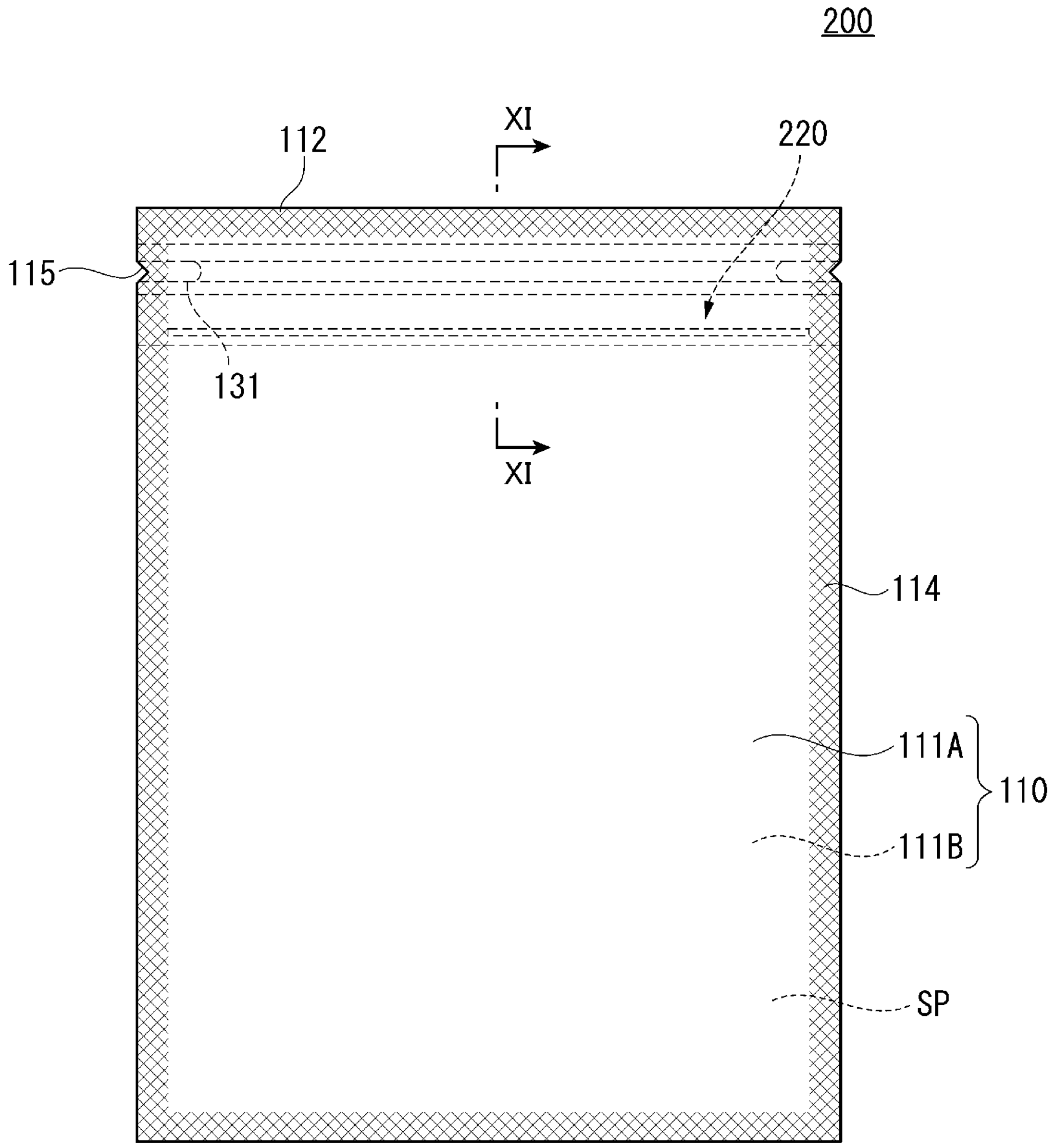
FIG. 10 is a plan view of a bag equipped with a zipper tape according to a second exemplary embodiment of the invention.
Figure 11:
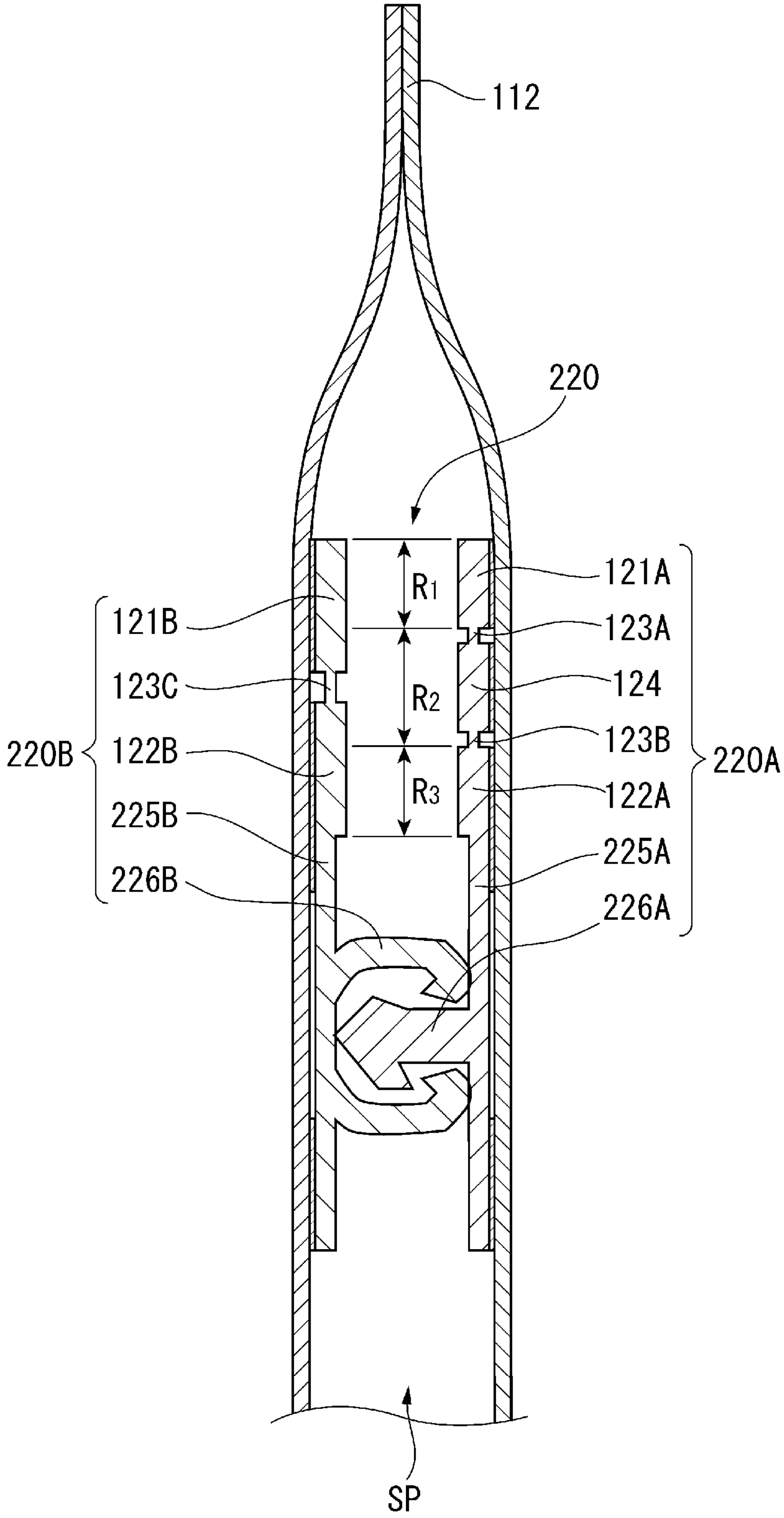
FIG. 11 is a cross-sectional view taken along a line XI-XI of FIG. 10.

FIG. 10 is a plan view of a bag equipped with a zipper tape according to a second exemplary embodiment of the invention. FIG. 11 is a cross-sectional view taken along a line XI-XI of FIG. 10. As illustrated in the drawings, a bag 200 equipped with a zipper tape includes: the bag body 110 similar to that of the first exemplary embodiment; and a zipper tape 220 bonded to each of the first surface 111A and the second surface 111B of the bag body 110, to define one side of the containing space SP provided between the first surface 111A and the second surface 111B.

As illustrated in FIG. 11, the zipper tape 220 is an elongated material that includes, in a cross-sectional shape thereof, a first portion 220A and a second portion 220B that are opposed to each other. The first portion 220A and the second portion 220B include, in cross-sectional shapes thereof: the first thick portions 121A and 121B, the second thick portions 122A and 122B, the thin portions 123A, 123B, and 123C, and the intermediate portion 124 which are similar to those of the first exemplary embodiment; and base strips 225A and 225B and engagement portions 226A and 226B which configure a zipper portion. The base strips 225A and 225B are respectively bonded to the first surface 111A and the second surface 111B of the bag body 110, and are opposed to each other. The engagement portions 226A and 226B respectively project from the base strips 225A and 225B, and are engageable with each other.

In the exemplary embodiment, the second thick portions 122A and 122B of the zipper tape 220 are respectively continuous with the base strips 225A and 225B. The first region $R_1$, the second region $R_2$, and the third region $R_3$ in a width direction of the zipper tape 220 are defined in such a manner that: the third region $R_3$ is adjacent to a zipper region including the base strips 225A and 225B; and the second region $R_2$ is positioned between the first region $R_1$ and the third region $R_3$. The first region $R_1$, the second region $R_2$, and the third region $R_3$ may cover an entire region in the width direction excluding the base strips 225A and 225B and the engagement portions 226A and 226B of the zipper tape 220, as in the example illustrated in FIG. 11, or may not cover the relevant region as in another example to be described later. In the illustrated example, the second thick portions 122A and 1228 are thicker than the base strips 225A and 225B; however, in another example, the second thick portions 122A and 1228 may have thicknesses that are equal to thicknesses of the base strips 225A and 2258. It is to be noted that shapes of the engagement portions 226A and 226B are not limited to the illustrated example. It is also possible for the engagement portions 226A and 226B to have various shapes of engagement portions of known zippers having a combination of a claw shape, a hook shape, a knob shape, or the like. In the illustrated example, the engagement portion 226A and the engagement portion 226B respectively have a male shape and a female shape; however, may be the other way around. In addition, although a pair of engagement portions is disposed in the illustrated example, a plurality of pairs of engagement portions may be disposed. The zipper tape 220 is formed, for example, by extrusion molding of a polyolefin-based resin as in the tape 120 of the first exemplary embodiment. A known additive such as a stabilizer, an antioxidant, a lubricant, an antistatic agent, or a colorant may be added to the material as necessary. Further, the material of the zipper tape 220 is not limited to a resin derived from a fossil fuel, and may be an environmentally friendly bioplastic or a mixture of a resin derived from a fossil fuel and a bioplastic. Examples of the bioplastic preferably include bio-polyethylene.

The zipper tape 220 may include a monomaterial resin composition which includes polyethylene as a main component, as with the tape 120 described above. In this case, the zipper tape 220 as a whole includes the resin composition which includes polyethylene as the main component. The zipper tape 220 including the monomaterial resin composition which includes polyethylene as the main component enables an environmentally friendly configuration having excellent recyclability. Further, using bio-polyethylene as polyethylene makes it possible to achieve an environmentally friendly configuration which is further excellent in recyclability.

Also in the exemplary embodiment, as illustrated in FIG. 11, the first region $R_1$, the second region $R_2$, and the third region $R_3$ are defined in the width direction of the zipper tape 220. Those regions are each common to the first portion 220A and the second portion 220B of the zipper tape 220, in a state in which the first portion 220A and the second portion 220B are opposed to each other. The second region $R_2$ is positioned between the first region $R_1$ and the third region $R_3$. The first portion 220A includes: the first thick portion 121A and the second thick portion 122A respectively provided in the first region $R_1$ and the third region $R_3$; the thin portion 123A and the thin portion 123B provided at respective both end portions, in the width direction, of the second region $R_2$; and the intermediate portion 124 provided between the thin portion 123A and the thin portion 123B. In contrast, the second portion 220B includes the first thick portion 121B and the second thick portion 122B that are respectively provided in the first region $R_1$ and the third region $R_3$ and are extending beyond the end portions, in the width direction, of the second region $R_2$. In other words, the second portion 220B includes the first thick portion 121B and the second thick portion 122B each provided from the first region $R_1$ or the third region $R_3$, over a portion of the second region $R_2$. The thin portion 123C provided in the second region $R_2$ of the second portion 220B is opposed to the intermediate portion 124 of the first portion 220A. As a result, as with the bag 100 equipped with the tape according to the first exemplary embodiment, it is possible in the bag 200 equipped with the zipper tape according to the exemplary embodiment to cause end portions of the zipper tape 220 and the bag body 110 after the unsealing to be formed at different levels, in a case where the user unseals the bag body 110 by tearing the bag body 110 from, as the starting point, the notch 115 formed in the side seal portion 114 on the end portion in the longitudinal direction of the tape 120, for example.

Figure 12:
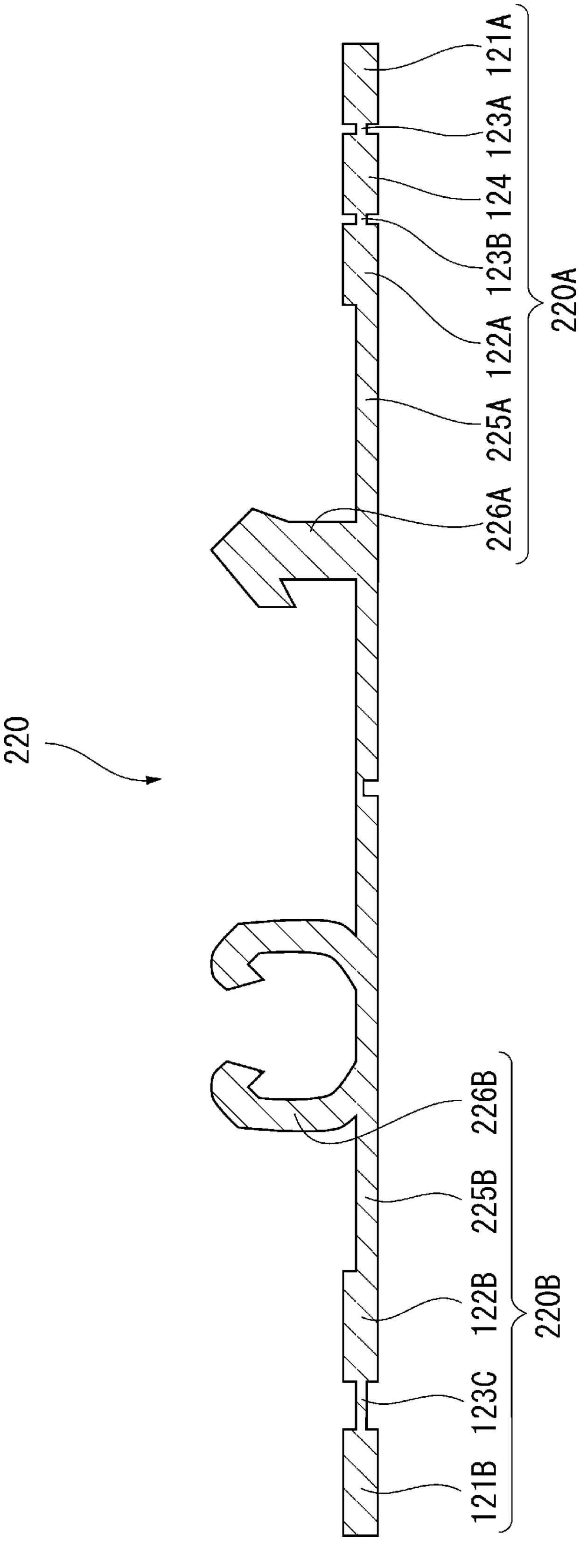
FIG. 12 is a cross-sectional view of an example of a zipper tape according to the second exemplary embodiment of the invention.

FIG. 12 is a cross-sectional view of an example of a zipper tape according to the second exemplary embodiment of the invention. The zipper tape 220 attached to the bag body 110 in the example described above with reference to FIGS. 10 and 11 is supplied independently prior to the attachment to the bag body 110. The first portion 220A and the second portion 220B may be coupled to each other at any position and supplied. In this case, for example, as illustrated in the drawings, the first portion 220A and the second portion 220B may be supplied in a state in which the respective end portions, in the width direction, of the base strips 225A and 225B are coupled to each other. The respective end portions are on a side opposite to the third region $R_3$. Alternatively, the first portion 220A and the second portion 220B may be supplied in a state in which the respective end portions, in the width direction, of the first portion 220A and the second portion 220B in the first region $R_1$ are coupled to each other. The respective end portions are on a side opposite to the second region $R_2$ illustrated in FIG. 11, i.e., between the first thick portions 121A and 121B. In this case, it is also possible to cause the first portion 220A and the second portion 220B of the zipper tape 220 to be opposed to each other by decoupling or folding a coupled portion. In other words, the zipper tape 220 according to the exemplary embodiment does not necessarily have to have the first portion 220A and the second portion 220B that are opposed to each other at the time of supplying, and may be configured in such a manner that it is possible to cause the first portion 220A and the second portion 220B to be opposed to each other.

In the example described above, the coupled portion between the first portion 220A and the second portion 220B of the zipper tape 220 is finally decoupled. However, a process of decoupling the coupled portion and engaging the engagement portions 226A and 226B with each other may be performed prior to attaching the zipper tape 220 to the bag body 110, or may be performed after attaching the zipper tape 220 to the bag body 110. In the latter case, at a point of time when the zipper tape 220 is attached to the bag body 110, the first portion 220A and the second portion 220B of the zipper tape 220 are opposed to each other by the zipper tape 220 being folded at the coupled portion. In this case, it is possible to cause the first portion 220A and the second portion 220B to be opposed to each other in a fixed positional relation. For example, in a case where the cutout 131 as described above with reference to FIG. 4, etc., is also formed in the zipper tape 220, maintaining a state in which the first portion 220A and the second portion 220B are coupled to each other until the cutouts 131 are formed makes it possible to reduce positional deviation of the cutouts 131 between the first portion 220A and the second portion 220B.

Figure 13:
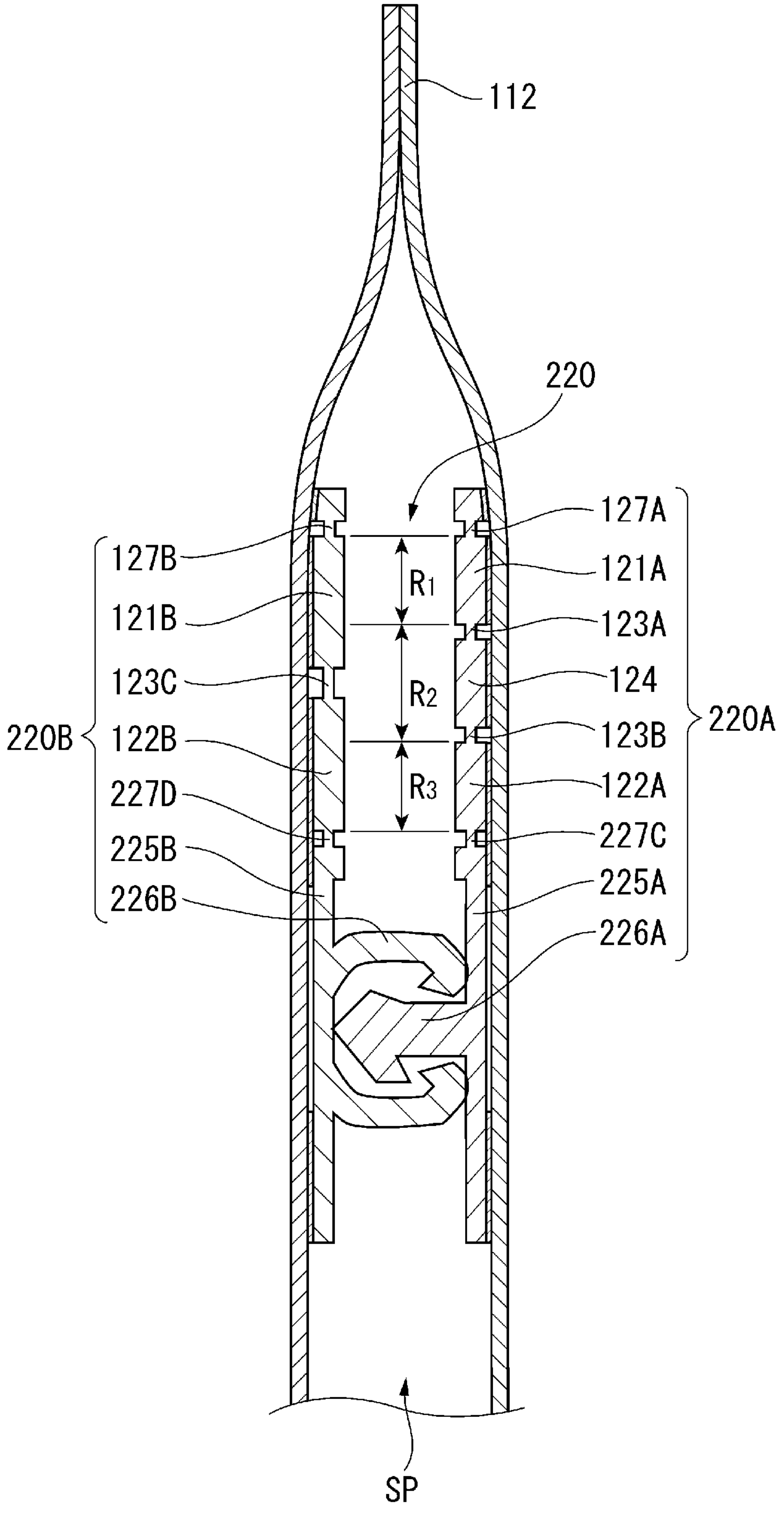
FIG. 13 is a cross-sectional view of another modification of the second exemplary embodiment.

FIG. 13 is a cross-sectional view of another modification of the second exemplary embodiment. In the example illustrated in FIG. 13, the first region $R_1$, the second region $R_2$, and the third region $R_3$ do not cover the entire region excluding the base strips 225A and 225B and the engagement portions 226A and 226B of the zipper tape 220. In the illustrated example, the thin portions 127A and 127B are respectively provided at end portions of the zipper tape 220 on sides of the thick portions 121A and 121B, and thin portions 227C and 227D are respectively provided between the thick portion 122A and the base strip 225A and between the thick portion 122B and the base strip 225B. As with the thin portion 127, the thin portion 227 is not intended to be broken when unsealing the bag 200 equipped with the zipper tape. In such a case, the first region $R_1$ is defined as a region in which the thick portion 121A and the thick portion 121B are provided (not including the thin portions 127A and 127B). In a similar manner, the third region $R_3$ is defined as a region in which the thick portion 122A and the thick portion 122B are provided (not including the thin portions 227C and 227D). In the illustrated examples, a region of the thin portions 127A and 127B and on sides of the end portions of the thin portions 127A and 127B in the width direction of the zipper tape 220 and a region from the thin portions 227C and 227D to the base strips 225A and 225B are excluded from the first region $R_1$, the second region $R_2$, and the third region $R_3$.

Figure 14:
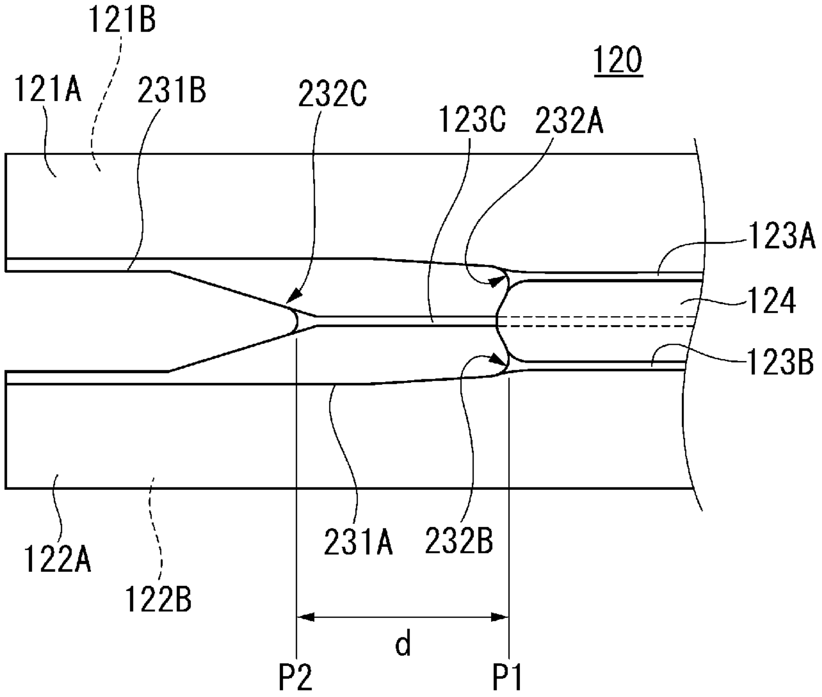
FIG. 14 is a diagram illustrating another example of a cutout according to an exemplary embodiment of the invention.
Figure 15:
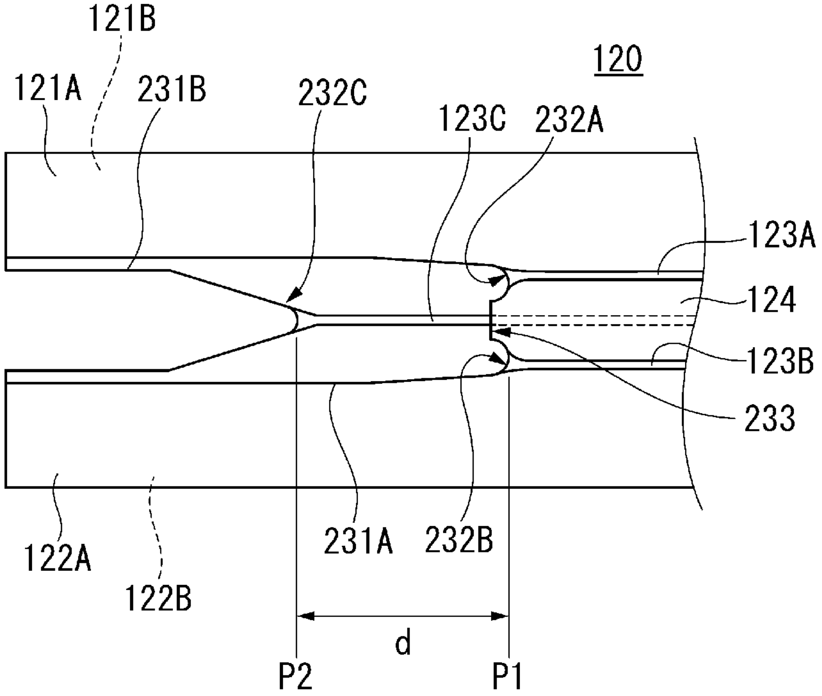
FIG. 15 is a diagram illustrating another example of the cutout according to the exemplary embodiment of the invention.

FIG. 14 is a diagram illustrating another example of a cutout according to an exemplary embodiment of the invention. A shape of the cutout illustrated in FIG. 14 is applicable, for example, to both the first and second exemplary embodiments described above. Specifically, the example illustrated in FIG. 14 has cutouts 231A and 231B provided at the end portion in the longitudinal direction of the tape 120 in an overlapping manner on the side seal portion 114 (not illustrated). The cutout 231A is provided on the first portion 120A side of the tape 120, and includes bulging portions 232A and 232B respectively directed toward the thin portions 123A and 123B. In contrast, the cutout 231B is provided on the second portion 120B side of the second portion 120B, and includes a taper portion 232C directed toward the thin portion 123C. Such cutouts 231A and 231B enables guiding of the tearing of the bag body to proceed along the thin portion formed in the tape 120, in the case where the user attempts to tear the bag body from, as the starting point, the end portion in the longitudinal direction of the tape 120, for example, as with the example described above with reference to FIGS. 5A and 5B. In another example as illustrated in FIG. 15, an intermediate portion of the bulging portions 232A and 232B may have a shape with no curvature.

Herein, the taper portion is a portion in which edges on both sides in a width direction of the cutout are straight and these straight lines are tapered in such a manner as to be gradually narrowed toward the thin portion. In contrast, the bulging portion is a portion in which the shape of the cutout is protruded toward the thin portion. As illustrated in FIG. 14, the end of the taper portion may have R (the curvature radius). As described above, giving R to the shape of the cutout makes it possible to guide the tearing to the thin portion even if slight deviation occurs in a position of the cutout during processing, and thus makes it possible to reduce the number of rejected products. In a case where the end of the taper portion has R, the taper portion and the bulging portion are common in including a portion having R toward the thin portion. It is the taper portion in a case where the portion having R has straight edges on both sides thereof. It is the bulging portion in a case where both sides thereof have curved edges, or have straight edges but are not tapered. For example, in the example of FIG. 14 described above, the taper portion 232C may be formed as the bulging portion.

For the end of the taper portion, R is, for example, in a range from 0.1 mm to 1.0 mm, and preferably from 0.2 mm to 0.7 mm, as with the example described above. For the bulging portion, R is, for example, in a range from 0.1 mm to 2.0 mm, preferably from 0.1 to 1.5 mm, more preferably from 0.1 mm to 1.0 mm, still more preferably from 0.2 mm to 0.8 mm, and particularly preferably from 0.2 mm to 0.7 mm.

In the example illustrated in FIG. 14, a first position P1 where the bulging portions 232A and 232B of the cutout 231A respectively couples to the thin portions 123A and 123B and a second position P2 where the taper portion 232C of the cutout 231B couples to the thin portion 123C are different from each other in the longitudinal direction of the tape 120. More specifically, in the illustrated example, the second position P2 is close to the end portion in the longitudinal direction of the tape 120 as compared with the first position P1. With such a configuration, there is a gap between a timing at which tearing of the thin portion 123C from the taper portion 232C is started and a timing at which tearing of the thin portions 123A and 123B from the bulging portions 232A and 232B is started. This makes it possible to selectively tear the thin portion 123A or 123B which has lower resistance. Similarly, in the example described above referring to FIGS. 5A and 5B, a position where the bifurcated taper portion 132A of the cutout 131A is coupled to the thin portions 123A and 123B and a position where the taper portion 132B of the cutout 131B is coupled to the thin portion 123C may be different from each other. A distance between the first position P1 and the second position P2 in the longitudinal direction of the tape 120 is preferably greater than or equal to 1 mm.

Figure 16:
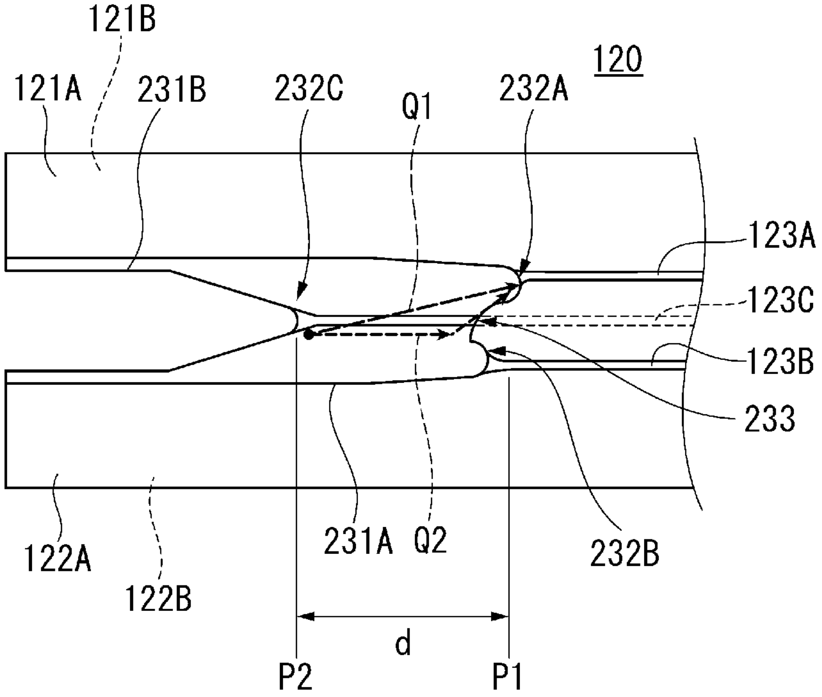
FIG. 16 is a diagram illustrating another example of the cutout according to the exemplary embodiment of the invention.

FIG. 16 is a diagram illustrating still another example of the cutout according to the exemplary embodiment of the invention. A shape of the cutout illustrated in FIG. 16 is applicable, for example, to both the first and second exemplary embodiments described above. The example illustrated in FIG. 16 also has the cutouts 231A and 231B provided at the end portion in the longitudinal direction of the tape 120 in the overlapping manner on the side seal portion 114 (not illustrated). The example of FIG. 16 is different from the example illustrated in FIG. 14 in that the bulging portion 232A, out of the bulging portions 232A and 232B included in the cutout 231A, bulges toward the center in the longitudinal direction of the tape 120 at a great degree as compared with the bulging portion 232B. An intermediate portion 233 between the bulging portions 232A and 232B thereby has a shape asymmetric with respect to the width direction of the tape 120, unlike the example of FIG. 14. Specifically, the intermediate portion 233 is inclined with respect to the width direction of the tape 120 from the bulging portion 232B to the bulging portion 232A. As a result, in a case where the first portion 120A and the second portion 120B of tape 120 are overlapped with each other, the intermediate portion 233 and the thin portion 123C of the second portion 120B do not cross each other at a right angle but cross each other obliquely. This allows the tearing to be guided to the bulging portion 232A and to the thin portion 123A that follows the bulging portion 232A, not only in a case where the tearing of the bag body proceeds toward the bulging portion 232A as indicated by an arrow Q1 illustrated in FIG. 16, but also in a case where the tearing proceeds toward the middle of the bulging portions 232A and 232B as indicated by an arrow Q2.

Figure 17:
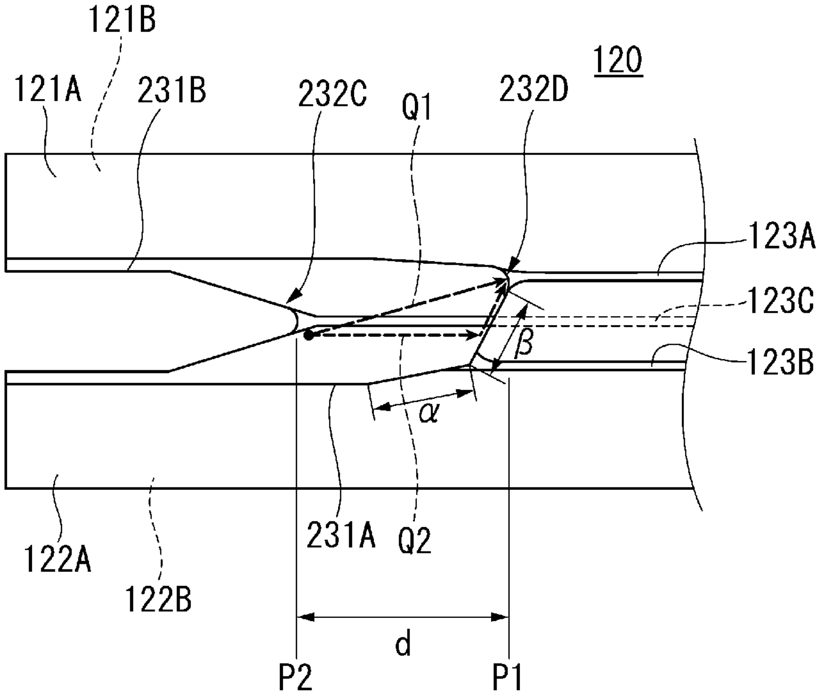
FIG. 17 is a diagram illustrating another example of the cutout according to the exemplary embodiment of the invention.

FIG. 17 is a diagram illustrating still another example of the cutout according to the exemplary embodiment of the invention. The example illustrated in FIG. 17 also has the cutouts 231A and 231B provided at the end portion in the longitudinal direction of the tape 120 in the overlapping manner on the side seal portion 114 (not illustrated). The example of FIG. 17 is different from the example illustrated in FIG. 14 in that the cutout 231A of the first portion 120A of the tape 120 has a taper portion 232D directed to the thin portion 123A, and has two inclined sides α and β from a second thick portion 122A side toward the taper portion 232D. Here, the inclined side means a part in which an edge on one side of the cutout is inclined with respect to both the longitudinal direction and the width direction of the tape 120. Although the illustrated example has two inclined sides α and β, the number of inclined sides may be one, or three or more. Alternatively, a curved part that protrudes outward may be formed in a similar manner as a bent part formed by the inclined sides α and β. In a case where the first portion 120A and the second portion 120B of the tape 120 are overlapped with each other, the inclined side or the curved part traverses the thin portion 123C of the second portion 120B. This allows, as with the example of FIG. 16 described above, the tearing to be guided to the taper portion 232D and to the thin portion 123A that follows the taper portion 232D, not only in a case where the tearing of the bag body proceeds toward the taper portion 232D as indicated by the arrow Q1, but also in a case where the tearing proceeds in a direction away from the taper portion 232D as indicated by the arrow Q2.

In the examples described above with reference to FIGS. 16 and 17, the tearing of the bag body is guided to the thin portion 123A which is on the side close to the top seal portion 112, but conversely, the tearing may be guided to the thin portion 123B which is on the side farther away from top seal portion 112. Specifically, in the example of FIG. 16, the bulging portion 232B may bulge toward the center in the longitudinal direction of the tape 120 at a great degree as compared with the bulging portion 232A. In the example of FIG. 17, the taper portion 232D may be formed toward the thin portion 1238.

Here, for the examples described above with reference to FIGS. 14 to 17, the first position P1 where the bulging portion 232A or the taper portion 232D couples to the thin portion 123A in the first portion 120A of the tape 120 and the second position P2 where the taper portion 232C or the bulging portion couples to the thin portion 123C in the second portion 1208 of the tape 120 are different from each other in the longitudinal direction of the tape 120. The second position P2 is close to the end portion in the longitudinal direction of the tape 120 as compared with the first position P1. A distance d between the first position P1 and the second position P2 is preferably greater than or equal to 2 mm, more preferably greater than or equal to 4 mm, and still more preferably greater than or equal to 8 mm. An upper limit thereof is preferably less than or equal to 50 mm, more preferably less than or equal to 30 mm, and still more preferably less than or equal to 20 mm.

The configurations including, without limitation, the thicknesses of the thick portions 121 and 122 and the thin portion 123 described in the first exemplary embodiment are similar to those in the second exemplary embodiment. In addition, any of modifications described above for the first exemplary embodiment is applicable to the second exemplary embodiment. In the exemplary embodiments described above, the first and second portions of the tape and the zipper tape have widths that are approximately equal to each other and are opposed to each other over entire surfaces thereof; however, other exemplary embodiments may be configured in such a manner that one of the first portion and the second portion of the tape or the zipper tape is wider than the other, thus, the first portion and the second portion are partially opposed to each other.

In addition, although examples are described above in which a container body is a bag body having a bag shape, a container equipped with a tape or a container equipped with a zipper tape may be provided by bonding a tape or a zipper tape to a container body other than the bag-shaped container body. In addition, an example is described above in which the first thick portion, the second thick portion, the thin portion, and the intermediate portion are continuous with each other; however, for example, in a case where not only the thick portion and the intermediate portion but also the thin portion are bonded to the surface of the container body, at least one part between the thin portion and the first thick portion, the second thick portion, or the intermediate portion, may be separated, and the tape or the zipper tape may be provided as a combination of a plurality of elongated materials.

Preferred exemplary embodiments of the invention have been described above in detail with reference to the accompanying drawings, but the invention is not limited to such exemplary embodiments. It is apparent that a skilled person in the art to which the invention pertains can arrive at various alterations and modifications within the scope of the technical idea recited in the appended claims, and it is understood that such alterations and modifications naturally fall within the technical scope of the invention.

The invention claimed is:

1. A tape comprising, in a cross-sectional shape thereof:
- a first portion; and
- a second portion, the first portion and the second portion being configured to be at least partially opposed to each other, wherein
- the first portion comprises
  - a first thick portion and a second thick portion each provided in corresponding one of a first region and a third region, out of the first region, a second region, and the third region in a width direction of the tape,
  - a first thin portion and a second thin portion provided at respective both end portions, in the width direction, of the second region, the second region being positioned between the first region and the third region, and
  - at least one intermediate portion provided between the first thin portion and the second thin portion,
- the second portion comprises
  - a third thick portion and a fourth thick portion that are each provided in corresponding one of the first region and the third region and are extending beyond end portions, in the width direction, of the second region, and
  - at least one third thin portion that is provided in the second region and is opposed to the intermediate portion,
- the first thin portion is directly opposed to only the third thick portion in a thickness direction of the tape, and
- the second thin portion is directly opposed to only the fourth thick portion in the thickness direction.

2. The tape according to claim 1, wherein the intermediate portion has a thickness corresponding to thicknesses of the first thick portion and the second thick portion.

3. The tape according to claim 1, wherein
- the first thin portion, the second thin portion, and the third thin portion each have a thickness in a range from 10 μm to 200 μm, and
- the first thick portion, the second thick portion, the third thick portion and the fourth thick portion each have a thickness in a range from 200 μm to 700 μm.

4. The tape according to claim 1, wherein the first region, the second region, and the third region cover the tape entirely.

5. The tape according to claim 1, wherein the first portion and the second portion are coupled to each other at respective end portions, in the width direction, of the first portion and the second portion in the first region or the third region, the respective end portions being on a side opposite to the second region.

6. A container equipped with a tape, the container comprising:
- a container body having a first surface and a second surface that are at least opposed to each other; and
- the tape according to claim 1 in which at least a portion of the first portion is bonded to the first surface and at least a portion of the second portion is bonded to the second surface.

7. The container equipped with the tape according to claim 6, wherein the first thick portion and the second thick portion and the intermediate portion are bonded to the first surface, and the third thick portion and the fourth thick portion are bonded to the second surface.

8. The container equipped with the tape according to claim 6, wherein the container body has a bag shape.

9. The container equipped with the tape according to claim 6, wherein
- side seal portions where the first surface and the second surface are bonded to each other are provided at both ends of the container body, and
- a cutout is provided at an end portion in a longitudinal direction of the tape in an overlapping manner on each of the side seal portions.

10. The container equipped with the tape according to claim 9, wherein
- the cutout is provided within the first portion comprising a taper portion or a bulging portion directed toward the first thin portion and the second thin portion, and
- the cutout is provided within the second portion comprising a taper portion or a bulging portion directed toward the third thin portion.

11. The container equipped with the tape according to claim 10, wherein
- the cutout is provided within the first portion comprising a first bulging portion and a second bulging portion respectively directed toward the first thin portion and the second thin portion, and the cutout is provided within the second portion comprising a taper portion directed toward the third thin portion.

12. The container equipped with the tape according to claim 11, wherein the first bulging portion projects toward a center in the longitudinal direction of the tape at a great degree as compared with the second bulging portion.

13. The container equipped with the tape according to claim 10, wherein the cutout is provided within the first portion comprising a first taper portion and a second taper portion respectively directed toward the first thin portion and the second thin portion, and the cutout is provided within the second portion comprising a taper portion directed toward the third thin portion.

14. The container equipped with the tape according to claim 10, wherein a first position where the taper portion or the bulging portion couples to the first thin portion in the first portion and a second position where the taper portion or the bulging portion couples to the third thin portion in the second portion are different from each other in the longitudinal direction of the tape.

15. The container equipped with the tape according to claim 14, wherein the second position is close to the end portion in the longitudinal direction of the tape as compared with the first position.

16. The container equipped with the tape according to claim 15, wherein a distance between the first position and the second position is in a range from 2 mm to 50 mm.

17. The container equipped with the tape according to claim 9, wherein the cutout is provided within the first portion comprising a first taper portion directed toward the first thin portion, and at least one inclined side or a curved part to be directed to the first taper portion, the cutout is provided within the second portion comprising a taper portion or a bulging portion directed toward the third thin portion, and, in a case where the first portion and the second portion are overlapped with each other, the at least one inclined side or the curved part traverses the third thin portion.

18. A method of manufacturing the container equipped with the tape according to claim 9, the method comprising:

forming the cutouts in the tape;

bonding the tape in which the cutouts are formed to the container body; and forming the side seal portions each traversing the cutouts on the container body to which the tape is bonded.

19. A zipper tape comprising, in a cross-sectional shape thereof:

a first portion; and a second portion, the first portion and the second portion being configured to be at least partially opposed to each other, wherein the first portion and the second portion each comprise, in a cross-sectional shape thereof, a base strip and an engagement portion, the engagement portions projecting from the respective base strips and being engageable with each other, the first portion comprises a first thick portion provided in a first region, out of the first region, a second region, and a third region in a width direction of the zipper tape, a second thick portion that is provided in the third region and is continuous with the base strip, a first thin portion and a second thin portion provided at respective both end portions, in the width direction, of the second region, the second region being positioned between the first region and the third region, at least one intermediate portion provided between the first thin portion and the second thin portion, and the second portion comprises a third thick portion and a fourth thick portion that are each provided in corresponding one of the first region and the third region and are extending beyond end portions, in the width direction, of the second region, and at least one third thin portion that is provided in the second region and is opposed to the intermediate portion, the first thin portion is directly opposed to only the third thick portion in a thickness direction of the tape, and the second thin portion is directly opposed to only the fourth thick portion in the thickness direction.

20. The zipper tape according to claim 19, wherein the intermediate portion has a thickness corresponding to thicknesses of the first thick portion and the second thick portion.

21. The zipper tape according to claim 19, wherein the first thin portion, the second thin portion, and the third thin portion each have a thickness in a range from 10 μm to 200 μm, and the first thick portion, the second thick portion, the third thick portion and the fourth thick portion each have a thickness in a range from 200 μm to 700 μm.

22. The zipper tape according to claim 19, wherein the first region, the second region, and the third region cover an entire region excluding the base strips and the engagement portions of the zipper tape.

23. The zipper tape according to claim 19, wherein the first portion and the second portion are coupled to each other at respective end portions, in the width direction, of the first portion and the second portion in the first region, or at respective end portions, in the width direction, of the base strips, the respective end portions of the first portion and the second portion being on a side opposite to the second region, the respective end portions of the base strips being on a side opposite to the third region.

* * * * *